United States Patent
Liu et al.

(10) Patent No.: US 12,126,479 B2
(45) Date of Patent: Oct. 22, 2024

(54) PHYSICAL LAYER PROTOCOL DATA UNIT PPDU TRANSMISSION METHOD AND RELATED APPARATUS

(71) Applicant: HUAWEI TECHNOLOGIES CO., LTD., Shenzhen (CN)

(72) Inventors: Chenchen Liu, Shenzhen (CN); Ming Gan, Shenzhen (CN); Jian Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 36 days.

(21) Appl. No.: 18/186,225

(22) Filed: Mar. 20, 2023

(65) Prior Publication Data

US 2023/0231752 A1    Jul. 20, 2023

Related U.S. Application Data

(63) Continuation of application No. PCT/CN2021/120238, filed on Sep. 24, 2021.

(30) Foreign Application Priority Data

Sep. 29, 2020 (CN) .......................... 202011047462.0

(51) Int. Cl.
    *H04L 27/26* (2006.01)
    *H04L 5/00* (2006.01)

(52) U.S. Cl.
    CPC ........ *H04L 27/2613* (2013.01); *H04L 5/0048* (2013.01)

(58) Field of Classification Search
    CPC .................... H04L 27/2613; H04L 5/0048
    See application file for complete search history.

(56) References Cited

U.S. PATENT DOCUMENTS

| | | | |
|---|---|---|---|
| 2020/0228380 A1 | 7/2020 | Yang et al. | |
| 2023/0179330 A1* | 6/2023 | Park | H04L 1/0031 |
| | | | 370/338 |
| 2024/0039765 A1* | 2/2024 | Raafat Hosny Mohamed Fahmy | H04L 25/0204 |

FOREIGN PATENT DOCUMENTS

| | | |
|---|---|---|
| CN | 110324268 A | 10/2019 |
| CN | 111669783 A | 9/2020 |
| WO | 2020060172 A1 | 3/2020 |

OTHER PUBLICATIONS

IEEE Std 802.11—2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.

(Continued)

*Primary Examiner* — Janice N Tieu
(74) *Attorney, Agent, or Firm* — HUAWEI TECHNOLOGIES CO., LTD.

(57) ABSTRACT

This disclosure relates to the wireless communication field, for example, is applied to a wireless local area network supporting the 802.11 standard, and in particular, to a physical layer protocol data unit (PPDU) transmission method and a related apparatus. The method includes: A first communication device generates and sends a first PPDU, where the first PPDU carries rotation coefficient indication information indicating a rotation coefficient of at least one field, which comprises at least one of an extremely high throughput short training field (EHT-STF) or an extremely high throughput long training field (EHT-LTF) and correspond to a frequency segment on which the first PPDU is transmitted, and the first PPDU is a sub-PPDU in an aggregated PPDU or a PPDU on a frequency segment (Continued)

among at least one PPDU in a multi-frequency segment transmission mode.

20 Claims, 10 Drawing Sheets

(56) References Cited

OTHER PUBLICATIONS

IEEE Std 802.11ac—2013, IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Approved Dec. 11, 2013, total 425 pages.

IEEE P802.11ax/D8.0, Oct. 2020, Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN, 820 pages.

IEEE P802.11be/D0.1, Sep. 2020, Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT), 299 pages.

\* cited by examiner

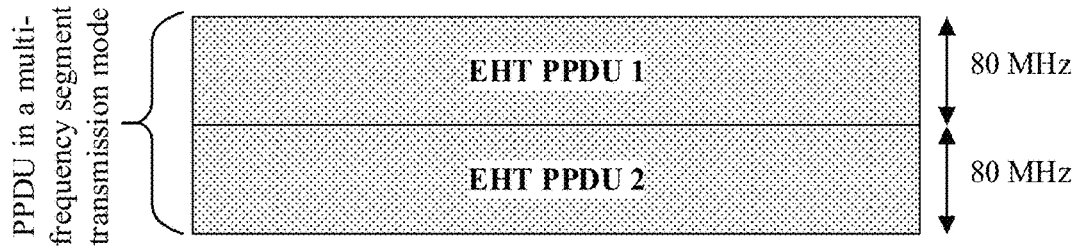

FIG. 5

| | LTF | L-SIG | RL-SIG | U-SIG 1 | EHT-SIG 1_1 |
|---|---|---|---|---|---|
| Primary 80 MHz/ primary 80 MHz | LTF | L-SIG | RL-SIG | U-SIG 1 | EHT-SIG 1_2 |
| | LTF | L-SIG | RL-SIG | U-SIG 1 | EHT-SIG 1_1 |
| | LTF | L-SIG | RL-SIG | U-SIG 1 | EHT-SIG 1_2 |
| | LTF | L-SIG | RL-SIG | U-SIG 2 | EHT-SIG 2_1 |
| Secondary 80 MHz/ secondary 80 MHz | LTF | L-SIG | RL-SIG | U-SIG 2 | EHT-SIG 2_2 |
| | LTF | L-SIG | RL-SIG | U-SIG 2 | EHT-SIG 2_1 |
| | LTF | L-SIG | RL-SIG | U-SIG 2 | EHT-SIG 2_2 |
| | LTF | L-SIG | RL-SIG | U-SIG 3 | EHT-SIG 3_1 |
| Third 80 MHz/ third 80 MHz | LTF | L-SIG | RL-SIG | U-SIG 3 | EHT-SIG 3_2 |
| | LTF | L-SIG | RL-SIG | U-SIG 3 | EHT-SIG 3_1 |
| | LTF | L-SIG | RL-SIG | U-SIG 3 | EHT-SIG 3_2 |
| | LTF | L-SIG | RL-SIG | U-SIG 4 | EHT-SIG 4_1 |
| Fourth 80 MHz/ fourth 80 MHz | LTF | L-SIG | RL-SIG | U-SIG 4 | EHT-SIG 4_2 |
| | LTF | L-SIG | RL-SIG | U-SIG 4 | EHT-SIG 4_1 |
| | LTF | L-SIG | RL-SIG | U-SIG 4 | EHT-SIG 4_2 |

FIG. 6

| L-STF Legacy short training field | L-LTF Legacy long training field | L-SIG Legacy signal field | VHT-SIG-A Very high throughput field A | VHT-STF Very high throughput short training field | VHT-LTF Very high throughput long training field | VHT-SIG-B Very high throughput field B | Data Data |

| L-STF<br>Legacy short<br>training field | L-LTF<br>Legacy long<br>training field | L-SIG<br>Legacy<br>signal field | RL-SIG<br>Repeated<br>legacy<br>signal field | U-SIG<br>Universal<br>signal field | EHT-SIG<br>EHT signal<br>field | EHT-STF<br>EHT short<br>training field | EHT-LTF<br>EHT long<br>training field | Data<br>Data | PE<br>Packet<br>extension |
|---|---|---|---|---|---|---|---|---|---|
| 8 μs | 8 μs | 4 μs | 4 μs | 8 μs | 4 μs per symbol (per symbol) | 4 μs | Variable | Variable | Variable |

FIG. 9

PHYSICAL LAYER PROTOCOL DATA UNIT PPDU TRANSMISSION METHOD AND RELATED APPARATUS

CROSS-REFERENCE TO RELATED APPLICATIONS

This disclosure is a continuation of International Application No. PCT/CN2021/120238, filed on Sep. 24, 2021, which claims priority to Chinese Patent Application No. 202011047462.0, filed on Sep. 29, 2020. The disclosures of the aforementioned applications are hereby incorporated by reference in their entireties.

TECHNICAL FIELD

This disclosure relates to the field of wireless communication technologies, and in particular, to a physical layer protocol data unit (PPDU) transmission method and a related apparatus.

BACKGROUND

With the development of the mobile internet and the popularization of smart terminals, data traffic increases rapidly, and users have higher requirements on communication service quality. The Institute of Electrical and Electronics Engineers (institute of electrical and electronics engineers, IEEE) 802.11ax standard no longer meets user requirements on large throughput, low jitter, and low latency. Therefore, there is an urgent need to develop a next-generation wireless local area network (wireless local area networks, WLAN) technology, that is, the IEEE 802.11be standard, the extremely high throughput (extremely high throughput, EHT) standard, or the Wi-Fi 7 standard. Different from the IEEE 802.11ax, the IEEE 802.11be uses an ultra-large bandwidth, for example, 320 MHz, to achieve ultra-high transmission rates and support scenarios with ultra-high user density.

In the EHT standard, to reduce information redundancy caused by indicating information within a 320 MHz bandwidth in a signal field (signal field, SIG), the 320 MHz bandwidth may be divided into a plurality of frequency segments whose frequencies do not overlap each other, and in a frequency segment, signaling information of a user (or a station) parking (parking) on the frequency segment is transmitted. For example, in an 80 MHz frequency segment, only signaling information of a user parking on the 80 MHz frequency segment is transmitted. Different 80 MHz frequency segments have different SIG fields, to transmit signaling information of users parking on the different 80 MHz frequency segments. In the EHT standard, physical layer protocol data units (physical protocol data unit, PPDU) in different generations of standards are allowed to be simultaneously/in parallel transmitted on different frequency segments, that is, an aggregated PPDU is transmitted on a plurality of frequency segments. FIG. 1 is a schematic diagram of an aggregated PPDU. As shown in FIG. 1, a sub-PPDU (a sub-PPDU 1) in an EHT format is transmitted on an 80 MHz frequency segment, and a sub-PPDU (a sub-PPDU 2) in a high efficient (high efficient, HE) format is transmitted on a 160 MHz frequency segment. The 80 MHz frequency segment and the 160 MHz frequency segment do not overlap in frequency. The EHT standard further allows transmitting a PPDU in a multi-frequency segment transmission mode, that is, simultaneously/in parallel transmitting a plurality of PPDUs of a same standard on a plurality of different frequency segments. For example, a PPDU in an EHT format is transmitted on an 80 MHz frequency segment, and a PPDU in the same format, namely, a PPDU in the EHT format, is transmitted on another 80 MHz frequency segment.

In both the aggregated PPDU and the PPDU using the multi-frequency segment transmission mode, a plurality of PPDUs (or sub-PPDUs) are simultaneously/in parallel transmitted on a plurality of frequency segments, and in the EHT standard, each frequency segment may indicate a different bandwidth. When a station receives a PPDU on a frequency segment, how to correctly determine a rotation coefficient of a short training field (short training field, STF) and a rotation coefficient of a long training field (long training field, LTF) on the frequency segment, to ensure correctness of data parsing in a subsequent phase becomes an urgent problem to be resolved.

SUMMARY

Embodiments of this disclosure provide a PPDU transmission method and a related apparatus, so that when a transmitting end sends an aggregated PPDU or uses a multi-frequency segment transmission mode, rotation coefficients of an STF and an LTF that correspond to a frequency segment on which a receiving end parks can be correctly determined, thereby improving parsing correctness at the receiving end.

The following describes this disclosure from different aspects. It can be understood that mutual reference may be made to the following implementations and advantageous effects of the different aspects.

According to a first aspect, this disclosure provides a PPDU transmission method. The method includes: A first communication device generates and sends a first PPDU, where the first PPDU is a sub-PPDU in an aggregated PPDU or a PPDU on a frequency segment in a PPDU in a multi-frequency segment transmission mode, the first PPDU carries rotation coefficient indication information indicating a rotation coefficient of at least one field in an EHT-STF and an EHT-LTF that correspond to a frequency segment on which the first PPDU is transmitted.

It may be understood that the method for transmitting a plurality of PPDUs may alternatively be described as follows: A first communication device generates a signal field of a PPDU, and sends the signal field on a first frequency segment. A channel bandwidth on which the PPDU is transmitted includes at least two frequency segments including the first frequency segment, the signal field carries rotation coefficient indication information indicating a rotation coefficient of at least one field in an EHT-STF and an EHT-LTF that correspond to the first frequency segment.

Optionally, the first communication device is an access point device.

Optionally, the rotation coefficient indication information is carried in an EHT-SIG or a universal signal field (universal SIG, U-SIG) of the first PPDU. Alternatively, the signal field is an EHT-SIG or a U-SIG.

In this solution, an indication of the rotation coefficient is added to the U-SIG or the EHT-SIG, to indicate a rotation coefficient corresponding to one of a plurality of frequency segments on which the aggregated PPDU or the PPDU in the multi-frequency segment transmission mode is transmitted. A rotation coefficient of an entire bandwidth may be considered at a transmitting end, to reduce PAPRs of STF and LTF fields within the entire bandwidth and further improve correctness of parsing a data field at a receiving end. This is achieved because a correct rotation coefficient is used to demodulate the data field.

According to a second aspect, this disclosure provides a PPDU transmission method. The method includes: A second communication device receives a first PPDU and parses the first PPDU, to obtain a rotation coefficient that is indicated by rotation coefficient indication information and that is of at least one field in an EHT-STF and an EHT-LTF corresponding to a frequency segment on which the first PPDU is transmitted, where the first PPDU is a sub-PPDU in an aggregated PPDU or a PPDU on a frequency segment in a PPDU in a multi-frequency segment transmission mode, the first PPDU carries the rotation coefficient indication information indicating the rotation coefficient of the at least one field of the EHT-STF and the EHT-LTF that correspond to the frequency segment on which the first PPDU is transmitted.

It may be understood that the PPDU transmission method may alternatively be described as follows: A second communication device receives a signal field of a PPDU on a first frequency segment, and parses the signal field, to obtain a rotation coefficient of at least one field in an EHT-STF and an EHT-LTF that correspond to the first frequency segment. A channel bandwidth on which the PPDU is transmitted includes at least two frequency segments, the at least two frequency segments include the first frequency segment, the signal field carries rotation coefficient indication information indicating the rotation coefficient of the at least one field of the EHT-STF and the EHT-LTF that correspond to the first frequency segment.

Optionally, the second communication device is a station device. A frequency segment on which the second communication device parks is the frequency segment on which the first PPDU is transmitted. Alternatively, the first frequency segment is a frequency segment on which the second communication device parks.

Optionally, the rotation coefficient indication information is carried in an EHT-SIG or a U-SIG of the first PPDU. Alternatively, the signal field is an EHT-SIG or a U-SIG.

According to a third aspect, this disclosure provides a communication apparatus. The communication apparatus may be a first communication device or a chip in a first communication device, for example, a Wi-Fi chip. The communication apparatus includes: a processing unit, configured to generate a first PPDU, where the first PPDU carries rotation coefficient indication information indicating a rotation coefficient of at least one field in an EHT-STF and an EHT-LTF that correspond to a frequency segment on which the first PPDU is transmitted, and the first PPDU is a sub-PPDU in an aggregated PPDU or a PPDU on a frequency segment in a PPDU in a multi-frequency segment transmission mode; and a transceiver unit, configured to send the first PPDU.

It may be understood that the function of the processing unit may alternatively be described as: being configured to generate a signal field of a PPDU, where a channel bandwidth on which the PPDU is transmitted includes at least two frequency segments, the at least two frequency segments include a first frequency segment, the signal field carries rotation coefficient indication information indicating a rotation coefficient of at least one field in an EHT-STF and an EHT-LTF that correspond to the first frequency segment. The function of the transceiver unit may alternatively be described as: sending the signal field on the first frequency segment.

Optionally, the rotation coefficient indication information is carried in an EHT-SIG or a U-SIG of the first PPDU. Alternatively, the signal field is an EHT-SIG or a U-SIG.

According to a fourth aspect, this disclosure provides a communication apparatus. The communication apparatus may be a second communication device or a chip in a second communication device, for example, a Wi-Fi chip. The communication apparatus includes: a transceiver unit, configured to receive a first PPDU, where the first PPDU carries rotation coefficient indication information indicating a rotation coefficient of at least one field in an EHT-STF and an EHT-LTF that correspond to a frequency segment on which the first PPDU is transmitted, and the first PPDU is a sub-PPDU in an aggregated PPDU or a PPDU on a frequency segment in a PPDU in a multi-frequency segment transmission mode; and a processing unit, configured to parse the first PPDU, to obtain the rotation coefficient that is indicated by the rotation coefficient indication information and that is of the at least one field of the EHT-STF and the EHT-LTF corresponding to the frequency segment on which the first PPDU is transmitted.

It may be understood that the function of the transceiver unit may alternatively be described as: receiving a signal field of a PPDU on a first frequency segment, where a channel bandwidth on which the PPDU is transmitted includes at least two frequency segments, the at least two frequency segments include the first frequency segment, the signal field carries rotation coefficient indication information indicating a rotation coefficient of at least one field in an EHT-STF and an EHT-LTF that correspond to the first frequency segment. The function of the processing unit may alternatively be described as: parsing the signal field, to obtain the rotation coefficient of the at least one field of the EHT-STF and the EHT-LTF that correspond to the first frequency segment.

Optionally, a frequency segment on which the communication apparatus parks is the frequency segment on which the first PPDU is transmitted. Alternatively, the first frequency segment is a frequency segment on which the communication apparatus parks.

Optionally, the rotation coefficient indication information is carried in an EHT-SIG or a U-SIG of the first PPDU. Alternatively, the signal field is an EHT-SIG or a U-SIG.

According to a fifth aspect, this disclosure provides a PPDU transmission method. The method includes: A first communication device generates and sends a first PPDU, where the first PPDU is a sub-PPDU in an aggregated PPDU or a PPDU on a frequency segment in a PPDU in a multi-frequency segment transmission mode, and rotation coefficients of an HE-STF, an HE-LTF, and a data field that correspond to a frequency segment of the first PPDU are the same, or rotation coefficients of an EHT-STF, an EHT-LTF, and a data field that correspond to a frequency segment of the first PPDU are the same. The sub-PPDU may be an EHT PPDU or an HE PPDU. In this specification, the frequency segment of the first PPDU is a frequency segment on which the first PPDU is transmitted.

Optionally, the first communication device is an access point device.

It can be learned that in this solution, the HE/EHT-STF, the HE/EHT-LTF, and the data field in the aggregated PPDU are rotated by a same phase (or multiplied by a same rotation coefficient) based on a frequency segment. A rotation coefficient of an entire bandwidth may be considered at a transmitting end, to reduce PAPRs of an STF and an LTF within the entire bandwidth, and further improve correctness of parsing the data field at a receiving end because the STF, the LTF, and the data field are rotated by the same phase (or multiplied by the same rotation coefficient), and demodulation of the data field is not affected. In addition, in this embodiment of this disclosure, signaling information does not need to be added to the PPDU to indicate the rotation coefficient, so that signaling overheads can be reduced.

Optionally, every 20 MHz, 40 MHz, 80 MHz, or 160 MHz in the HE-STF, the HE-LTF, and the data field that correspond to the frequency segment of the first PPDU corresponds to one rotation coefficient. Alternatively, every 20 MHz, 40 MHz, 80 MHz, or 160 MHz in the EHT-STF, the EHT-LTF, and the data field that correspond to the frequency segment of the first PPDU corresponds to one rotation coefficient. The first communication device (transmitting end) may process the HE-STF, the HE-LTF, and the data field by using a corresponding rotation coefficient, or the first communication device (transmitting end) may process the EHT-STF, the EHT-LTF, and the data field by using a corresponding rotation coefficient. For example, frequency domain signals corresponding to the HE-STF, the HE-LTF, and the data field are rotated by a specified phase based on the rotation coefficients. Alternatively, frequency domain signals corresponding to the EHT-STF, the EHT-LTF, and the data field are rotated by a specified phase based on the rotation coefficients.

Optionally, the signal field (herein referred to as a signal field preceding the HE-STF) of the first PPDU and the subsequent HE-STF, HE-LTF, and data field have different rotation coefficients. Alternatively, the signal field (herein referred to as a signal field preceding the EHT-STF) of the first PPDU and the subsequent EHT-STF, EHT-LTF, and data field have different rotation coefficients. Rotation coefficients in different bandwidths are specified in a standard or determined by the transmitting end (the first communication device) from a signal on an entire bandwidth. The transmitting end (the first communication device) generates and transmits, according to specifications in the standard, a PPDU (the first PPDU) on which phase rotation is performed.

According to a sixth aspect, this disclosure provides a PPDU transmission method. The method includes: A second communication device receives a first PPDU, and parses the first PPDU. The first PPDU is a sub-PPDU in an aggregated PPDU or a PPDU on a frequency segment in a PPDU in a multi-frequency segment transmission mode, and rotation coefficients of an HE-STF, an HE-LTF, and a data field that correspond to a frequency segment of the first PPDU are the same, or rotation coefficients of an EHT-STF, an EHT-LTF, and a data field that correspond to a frequency segment of the first PPDU are the same. The sub-PPDU may be an EHT PPDU or an HE PPDU.

Optionally, in a process of parsing the first PPDU, the second communication device obtains a channel estimation result by using the HE/EHT-LTF. The channel estimation result includes phase rotation information corresponding to each frequency segment, and then demodulates a corresponding data field by using the channel estimation result. Because channel estimation information (such as the HE/EHT-LTF) and the data field include a same rotation coefficient, and are rotated by a same phase, the channel estimation information and the data field may cancel each other in a demodulation process, to restore original data. The original data herein may be understood as pre-modulation data at a transmitting end (a first communication device).

Optionally, the second communication device is a station device. A frequency segment on which the second communication device parks is a frequency segment on which the first PPDU is transmitted.

Optionally, every 20 MHz, 40 MHz, 80 MHz, or 160 MHz in the HE-STF, the HE-LTF, and the data field that correspond to the frequency segment of the first PPDU corresponds to one rotation coefficient. Alternatively, every 20 MHz, 40 MHz, 80 MHz, or 160 MHz in the EHT-STF, the EHT-LTF, and the data field that correspond to the frequency segment of the first PPDU corresponds to one rotation coefficient.

Optionally, the signal field (herein referred to as a signal field preceding the HE-STF) of the first PPDU and the subsequent HE-STF, HE-LTF, and data field have different rotation coefficients. Alternatively, the signal field (herein referred to as a signal field preceding the EHT-STF) of the first PPDU and the subsequent EHT-STF, EHT-LTF, and data field have different rotation coefficients. Rotation coefficients in different bandwidths are specified in a standard or determined by the transmitting end (the first communication device) from a signal on an entire bandwidth.

According to a seventh aspect, this disclosure provides a communication apparatus. The communication apparatus may be a first communication device or a chip in a first communication device, for example, a Wi-Fi chip. The communication apparatus includes: a processing unit, configured to generate a first PPDU, where the first PPDU is a sub-PPDU in an aggregated PPDU or a PPDU on a frequency segment in a PPDU in a multi-frequency segment transmission mode, and rotation coefficients of an HE-STF, an HE-LTF, and a data field that correspond to a frequency segment of the first PPDU are the same, or rotation coefficients of an EHT-STF, an EHT-LTF, and a data field that correspond to a frequency segment of the first PPDU are the same; and a transceiver unit, configured to send the first PPDU. The sub-PPDU is an EHT PPDU or an HE PPDU.

Optionally, every 20 MHz, 40 MHz, 80 MHz, or 160 MHz in the HE-STF, the HE-LTF, and the data field that correspond to the frequency segment of the first PPDU corresponds to one rotation coefficient. Alternatively, every 20 MHz, 40 MHz, 80 MHz, or 160 MHz in the EHT-STF, the EHT-LTF, and the data field that correspond to the frequency segment of the first PPDU corresponds to one rotation coefficient.

Optionally, the signal field (herein referred to as a signal field preceding the HE-STF) of the first PPDU and the subsequent HE-STF, HE-LTF, and data field have different rotation coefficients. Alternatively, the signal field (herein referred to as a signal field preceding the EHT-STF) of the first PPDU and the subsequent EHT-STF, EHT-LTF, and data field have different rotation coefficients. Rotation coefficients in different bandwidths are specified in a standard or determined by the transmitting end (the first communication device) from a signal on an entire bandwidth. The transmitting end (the first communication device) generates and transmits, according to specifications in the standard, a PPDU (the first PPDU) on which phase rotation is performed.

According to an eighth aspect, this disclosure provides a communication apparatus. The communication apparatus may be a second communication device or a chip in a second communication device, for example, a Wi-Fi chip. The communication apparatus includes: a transceiver unit, configured to receive a first PPDU, where the first PPDU is a sub-PPDU in an aggregated PPDU or a PPDU on a frequency segment in a PPDU in a multi-frequency segment transmission mode, and rotation coefficients of an HE-STF, an HE-LTF, and a data field that correspond to a frequency segment of the first PPDU are the same, or rotation coefficients of an EHT-STF, an EHT-LTF, and a data field that correspond to a frequency segment of the first PPDU are the same; and a processing unit, configured to parse the first PPDU. The sub-PPDU may be an EHT PPDU or an HE PPDU.

Optionally, the processing unit is specifically configured to: obtain a channel estimation result by using the HE/EHT-LTF, where the channel estimation result includes phase rotation information corresponding to each frequency segment; and demodulate a corresponding data field by using the channel estimation result.

Optionally, a frequency segment on which the communication apparatus parks is the frequency segment on which the first PPDU is transmitted.

Optionally, every 20 MHz, 40 MHz, 80 MHz, or 160 MHz in the HE-STF, the HE-LTF, and the data field that correspond to the frequency segment of the first PPDU corresponds to one rotation coefficient. Alternatively, every 20 MHz, 40 MHz, 80 MHz, or 160 MHz in the EHT-STF, the EHT-LTF, and the data field that correspond to the frequency segment of the first PPDU corresponds to one rotation coefficient.

Optionally, the signal field (herein referred to as a signal field preceding the HE-STF) of the first PPDU and the subsequent HE-STF, HE-LTF, and data field have different rotation coefficients. Alternatively, the signal field (herein referred to as a signal field preceding the EHT-STF) of the first PPDU and the subsequent EHT-STF, EHT-LTF, and data field have different rotation coefficients. Rotation coefficients in different bandwidths are specified in a standard or determined by the transmitting end (the first communication device) from a signal on an entire bandwidth.

According to a ninth aspect, this disclosure provides a PPDU transmission method. The method includes: A first communication device generates and sends a first PPDU, where the first PPDU carries a transmit bandwidth of an aggregated PPDU or a PPDU in a multi-frequency segment transmission mode, the transmit bandwidth includes at least two frequency segments, and the first PPDU is a sub-PPDU transmitted on any one of the at least two frequency segments in the aggregated PPDU or a PPDU transmitted on any one of the at least two frequency segments in the PPDU in the multi-frequency segment transmission mode.

It may be understood that the PPDU transmission method may alternatively be described as follows: A first communication device generates a signal field of a PPDU, and sends the signal field on a first frequency segment. A channel bandwidth on which the PPDU is transmitted includes at least two frequency segments, the at least two frequency segments include the first frequency segment, and the signal field carries the channel bandwidth.

Optionally, the first communication device is an access point device.

Optionally, the transmit bandwidth is carried in an EHT-SIG or a U-SIG of the first PPDU. Alternatively, the signal field is an EHT-SIG or a U-SIG. The EHT-SIG or the U-SIG further carries a bandwidth of a frequency segment (or the first frequency segment) on which the first PPDU is transmitted.

According to a tenth aspect, this disclosure provides a PPDU transmission method. The method includes: A second communication device receives a first PPDU, and determines, based on a frequency segment on which the second communication device parks and a transmit bandwidth carried in the first PPDU, a rotation coefficient of at least one field in an EHT-STF and an EHT-LTF that correspond to the frequency segment on which the second communication device parks. The first PPDU carries a transmit bandwidth of an aggregated PPDU or a PPDU in a multi-frequency segment transmission mode, the transmit bandwidth includes at least two frequency segments, and the first PPDU is a sub-PPDU transmitted on any one of the at least two frequency segments in the aggregated PPDU or a PPDU transmitted on any one of the at least two frequency segments in the PPDU in the multi-frequency segment transmission mode.

It may be understood that the PPDU transmission method may alternatively be described as follows: A second communication device receives a signal field of a PPDU on a first frequency segment, and determines, based on a channel bandwidth carried in the signal field and a first frequency segment, a rotation coefficient of at least one field in an EHT-STF and an EHT-LTF that correspond to the first frequency segment. The channel bandwidth on which the PPDU is transmitted includes at least two frequency segments, the at least two frequency segments include the first frequency segment, and the signal field carries the channel bandwidth.

Optionally, the second communication device is a station device. A frequency segment on which the second communication device parks is a frequency segment on which the first PPDU is transmitted. Alternatively, a frequency segment on which the second communication device parks is the first frequency segment.

Optionally, the transmit bandwidth is carried in an EHT-SIG or a U-SIG of the first PPDU. Alternatively, the signal field is an EHT-SIG or a U-SIG. The EHT-SIG or the U-SIG further carries a bandwidth of a frequency segment (or the first frequency segment) on which the first PPDU is transmitted.

In this solution, an indication of the transmit bandwidth is added to the U-SIG or the EHT-SIG to indicate the transmit bandwidth (or the channel bandwidth or an entire bandwidth) on which the aggregated PPDU or the PPDU in the multi-frequency segment transmission mode is transmitted, so that a receiving end determines, based on the transmit bandwidth and a location, in the transmit bandwidth, of a frequency segment on which the receiving end parks, rotation coefficients of an EHT-STF and an EHT-LTF that correspond to the frequency segment on which the receiving end parks. A rotation coefficient of the entire bandwidth may be considered at the transmitting end, to reduce PAPRs of STF and LTF fields within the entire bandwidth and further improve correctness of parsing a data field at a receiving end. This is achieved because a correct rotation coefficient is used to demodulate the data field.

According to an eleventh aspect, this disclosure provides a communication apparatus. The communication apparatus may be a first communication device or a chip in a first communication device, for example, a Wi-Fi chip. The communication apparatus includes: a processing unit, configured to generate a first PPDU, where the first PPDU carries a transmit bandwidth of an aggregated PPDU or a PPDU in a multi-frequency segment transmission mode, the transmit bandwidth includes at least two frequency segments, and the first PPDU is a sub-PPDU transmitted on any one of the at least two frequency segments in the aggregated PPDU or a PPDU transmitted on any one of the at least two frequency segments in the PPDU in the multi-frequency segment transmission mode; and a transceiver unit, configured to send the first PPDU.

It may be understood that the function of the processing unit may alternatively be described as: generating a signal field of a PPDU, where a channel bandwidth on which the PPDU is transmitted includes at least two frequency segments, the at least two frequency segments include a first frequency segment, and the signal field carries the channel bandwidth. The function of the transceiver unit may alternatively be described as: sending the signal field on the first frequency segment.

Optionally, the transmit bandwidth is carried in an EHT-SIG or a U-SIG of the first PPDU. Alternatively, the signal field is an EHT-SIG or a U-SIG. The EHT-SIG or the U-SIG further carries a bandwidth of a frequency segment (or the first frequency segment) on which the first PPDU is transmitted.

According to a twelfth aspect, this disclosure provides a communication apparatus. The communication apparatus may be a second communication device or a chip in a second communication device, for example, a Wi-Fi chip. The communication apparatus includes: a transceiver unit, configured to receive a first PPDU, where the first PPDU carries a transmit bandwidth of an aggregated PPDU or a PPDU in a multi-frequency segment transmission mode, the transmit bandwidth includes at least two frequency segments, and the first PPDU is a sub-PPDU transmitted on any one of the at least two frequency segments in the aggregated PPDU or a PPDU transmitted on any one of the at least two frequency segments in the PPDU in the multi-frequency segment transmission mode; and a processing unit, configured to determine, based on a frequency segment on which the communication apparatus parks and the transmit bandwidth carried in the first PPDU, a rotation coefficient of at least one field in an EHT-STF and an EHT-LTF that correspond to the frequency segment on which the communication apparatus parks.

It may be understood that the function of the transceiver unit may alternatively be described as: receiving a signal field of a PPDU on a first frequency segment, where a channel bandwidth on which the PPDU is transmitted includes at least two frequency segments, the at least two frequency segments include the first frequency segment, and the signal field carries the channel bandwidth. The function of the processing unit may alternatively be described as: determining, based on the channel bandwidth carried in the signal field and the first frequency segment, a rotation coefficient of at least one field in an EHT-STF and an EHT-LTF that correspond to the first frequency segment.

Optionally, a frequency segment on which the communication apparatus parks is the frequency segment on which the first PPDU is transmitted. Alternatively, a frequency segment on which the communication apparatus parks is the first frequency segment.

Optionally, the transmit bandwidth is carried in an EHT-SIG or a U-SIG of the first PPDU. Alternatively, the signal field is an EHT-SIG or a U-SIG. The EHT-SIG or the U-SIG further carries a bandwidth of a frequency segment (or the first frequency segment) on which the first PPDU is transmitted.

According to a thirteenth aspect, this disclosure provides a PPDU transmission method. The method includes: A second communication device determines, based on a frequency segment on which the second communication device parks and a correspondence between each frequency segment in a 320 MHz bandwidth and a rotation coefficient, a rotation coefficient of at least one field in an EHT-STF and an EHT-LTF that correspond to the frequency segment on which the second communication device parks.

The correspondence between each frequency segment in the 320 MHz bandwidth and the rotation coefficient is specified in a standard protocol.

In this solution, a correspondence between each frequency segment in a maximum bandwidth supported by the standard protocol and a rotation coefficient is restricted in a standard protocol, and an additional indication does not need to be added to a signal field. In this way, rotation coefficients of an EHT-STF and an EHT-LTF that correspond to a frequency segment on which a receiving end parks can be determined, so that not only signaling overheads can be reduced, but also a rotation coefficient of the maximum bandwidth can be considered, thereby reducing PAPRs of the STF and the LTF fields.

According to a fourteenth aspect, this disclosure provides a communication apparatus. The communication apparatus may be a second communication device or a chip in a second communication device, for example, a Wi-Fi chip. The communication apparatus includes: a processing unit, configured to determine, based on a frequency segment on which the communication apparatus parks and a correspondence between each frequency segment in a 320 MHz bandwidth and a rotation coefficient, a rotation coefficient of at least one field in an EHT-STF and an EHT-LTF that correspond to the frequency segment on which the communication apparatus parks.

The correspondence between each frequency segment in the 320 MHz bandwidth and the rotation coefficient is specified in a standard protocol.

According to a fifteenth aspect, this disclosure provides a PPDU transmission method. The method includes: A first communication device generates and sends an HE PPDU, where the HE PPDU is a sub-PPDU in an aggregated PPDU or a PPDU on a frequency segment in a PPDU in a multi-frequency segment transmission mode. The first communication device may be an EHT standard device.

According to a sixteenth aspect, this disclosure provides a PPDU transmission method. The method includes: A second communication device receives an HE PPDU on a frequency segment on which the second communication device parks, and parses the received HE PPDU, where both rotation coefficients of an HE-STF and an HE-LTF that correspond to the frequency segment on which the second communication device parks are 1. The HE PPDU is a sub-PPDU in an aggregated PPDU or a PPDU on a frequency segment in a PPDU in a multi-frequency segment transmission mode.

Optionally, the second communication device is an 802.11ax standard device.

In this solution, the device of the 802.11ax standard is limited to parking only on a frequency segment corresponding to a rotation coefficient of 1, so that receiving of an old-standard device may not be affected, thereby supporting a new feature of physical layer PPDU aggregation in 802.11be.

According to a seventeenth aspect, this disclosure provides a communication apparatus. The communication apparatus may be a first communication device or a chip in a first communication device, for example, a Wi-Fi chip. The communication apparatus includes: a processing unit, configured to generate an HE PPDU, where the HE PPDU is a sub-PPDU in an aggregated PPDU or a PPDU on a frequency segment in a PPDU in a multi-frequency segment transmission mode; and a transceiver unit, configured to send the HE PPDU.

According to an eighteenth aspect, this disclosure provides a communication apparatus. The communication apparatus may be a second communication device or a chip in a second communication device, for example, a Wi-Fi chip. The communication apparatus includes: a transceiver unit, configured to receive an HE PPDU on a frequency segment on which the communication apparatus parks, where both rotation coefficients of an HE-STF and an HE-LTF that correspond to the frequency segment on which the communication apparatus parks are 1; and a processing unit, configured to parse the received HE PPDU. The HE PPDU is a sub-PPDU in an aggregated PPDU or a PPDU on a frequency segment in a PPDU in a multi-frequency segment transmission mode.

According to a nineteenth aspect, this disclosure provides a PPDU transmission method. The method includes: when rotation coefficients of an HE-STF and an HE-LTF that correspond to a frequency segment on which a second communication device parks are not 1, a first communication device performs phase rotation on rotation coefficients of an STF and an LTF that correspond to all frequency segments on which an aggregated PPDU or a PPDU in a multi-frequency segment transmission mode is transmitted, so that both the rotation coefficients of the HE-STF and the HE-LTF that correspond to the frequency segment on which the second communication device parks change to 1. The first communication device generates and sends an HE PPDU, where the HE PPDU is a sub-PPDU in the aggregated PPDU or a PPDU on a frequency segment in the PPDU in the multi-frequency segment transmission mode.

Optionally, the first communication device may be an EHT standard device. The second communication device is an 802.11ax standard device.

In this solution, rotation coefficients corresponding to all frequency segments (or a channel bandwidth) on which an aggregated PPDU or a PPDU in a multi-frequency segment transmission mode is transmitted are multiplied by −1, so that both the rotation coefficients of the HE-STF and the HE-LTF that correspond to the frequency segment on which the second communication device parks change to 1. This may not affect a PAPR within the channel bandwidth, and does not affect receiving of an old standard device.

According to a twentieth aspect, this disclosure provides a PPDU transmission method. The method includes: A second communication device receives an HE PPDU on a frequency segment on which the second communication device parks, and parses the received HE PPDU, where the HE PPDU is a sub-PPDU in an aggregated PPDU or a PPDU on a frequency segment in a PPDU in a multi-frequency segment transmission mode.

Optionally, the second communication device is an 802.11ax standard device.

According to a twenty-first aspect, this disclosure provides a communication apparatus. The communication apparatus may be a first communication device or a chip in a first communication device, for example, a Wi-Fi chip. The communication apparatus includes: a processing unit, configured to: when rotation coefficients of an HE-STF and an HE-LTF that correspond to a frequency segment on which a second communication device parks are not 1, perform phase rotation on rotation coefficients of an STF and an LTF that correspond to all frequency segments on which an aggregated PPDU or a PPDU in a multi-frequency segment transmission mode is transmitted, so that both the rotation coefficients of the HE-STF and the HE-LTF that correspond to the frequency segment on which the second communication device parks change to 1, where the processing unit is further configured to generate an HE PPDU, and the HE PPDU is a sub-PPDU in the aggregated PPDU or a PPDU on a frequency segment in the PPDU in the multi-frequency segment transmission mode; and a transceiver unit, configured to send the HE PPDU.

According to a twenty-second aspect, this disclosure provides a communication apparatus. The communication apparatus may be a second communication device or a chip in a second communication device, for example, a Wi-Fi chip. The communication apparatus includes: a transceiver unit, configured to receive an HE PPDU on a frequency segment on which the communication apparatus parks, where the HE PPDU is a sub-PPDU in an aggregated PPDU or a PPDU on a frequency segment in a PPDU in a multi-frequency segment transmission mode; and a processing unit, configured to parse the received HE PPDU.

According to a twenty-third aspect, this disclosure provides a communication apparatus. The communication apparatus is specifically a first communication device and includes a processor and a transceiver.

In a possible design, the processor is configured to generate a first PPDU, where the first PPDU carries rotation coefficient indication information indicating a rotation coefficient of at least one field in an EHT-STF and an EHT-LTF that correspond to a frequency segment on which the first PPDU is transmitted, and the first PPDU is a sub-PPDU in an aggregated PPDU or a PPDU on a frequency segment in a PPDU in a multi-frequency segment transmission mode. The transceiver is configured to send the first PPDU.

In a possible design, the processor is configured to generate a first PPDU, where the first PPDU is a sub-PPDU in an aggregated PPDU or a PPDU on a frequency segment in a PPDU in a multi-frequency segment transmission mode, and rotation coefficients of an HE-STF, an HE-LTF, and a data field that correspond to a frequency segment of the first PPDU are the same, or rotation coefficients of an EHT-STF, an EHT-LTF, and a data field that correspond to a frequency segment of the first PPDU are the same. The transceiver is configured to send the first PPDU.

In a possible design, the processor is configured to generate a first PPDU, where the first PPDU carries a transmit bandwidth of an aggregated PPDU or a PPDU in a multi-frequency segment transmission mode, the transmit bandwidth includes at least two frequency segments, and the first PPDU is a sub-PPDU transmitted on any one of the at least two frequency segments in the aggregated PPDU or a PPDU transmitted on any one of the at least two frequency segments in the PPDU in the multi-frequency segment transmission mode. The transceiver is configured to send the first PPDU.

In a possible design, the processor is configured to generate an HE PPDU, where the HE PPDU is a sub-PPDU in an aggregated PPDU or a PPDU on a frequency segment in a PPDU in a multi-frequency segment transmission mode. The transceiver is configured to send the HE PPDU.

In a possible design, the processor is configured to: when rotation coefficients of an HE-STF and an HE-LTF that correspond to a frequency segment on which a second communication device parks are not 1, perform phase rotation on rotation coefficients of an STF and an LTF that correspond to all frequency segments on which an aggregated PPDU or a PPDU in a multi-frequency segment transmission mode is transmitted, so that both the rotation coefficients of the HE-STF and the HE-LTF that correspond to the frequency segment on which the second communication device parks change to 1. The processor is further configured to generate an HE PPDU, and the HE PPDU is a sub-PPDU in the aggregated PPDU or the PPDU on the frequency segment in the PPDU in the multi-frequency segment transmission mode. The transceiver is configured to send the HE PPDU.

Optionally, the first communication device may further include a memory. The memory is coupled to the processor, and stores program instructions and data that are necessary for an AP MLD.

According to a twenty-fourth aspect, this disclosure provides a communication apparatus. The communication apparatus is specifically a second communication device and includes a processor and a transceiver.

In a possible design, the transceiver is configured to receive a first PPDU, where the first PPDU carries rotation coefficient indication information indicating a rotation coefficient of at least one field in an EHT-STF and an EHT-LTF that correspond to a frequency segment on which the first PPDU is transmitted, and the first PPDU is a sub-PPDU in an aggregated PPDU or a PPDU on a frequency segment in a PPDU in a multi-frequency segment transmission mode. The processor is configured to parse the first PPDU, to obtain the rotation coefficient that is indicated by the rotation coefficient indication information and that is of the at least one field of the EHT-STF and the EHT-LTF corresponding to the frequency segment on which the first PPDU is transmitted.

In a possible design, the transceiver is configured to receive a first PPDU, where the first PPDU is a sub-PPDU in an aggregated PPDU or a PPDU on a frequency segment in a PPDU in a multi-frequency segment transmission mode, and rotation coefficients of an HE-STF, an HE-LTF, and a data field that correspond to a frequency segment of the first PPDU are the same, or rotation coefficients of an EHT-STF, an EHT-LTF, and a data field that correspond to a frequency segment of the first PPDU are the same. The processor is configured to parse the first PPDU.

In a possible design, the transceiver is configured to receive a first PPDU, where the first PPDU carries a transmit bandwidth of an aggregated PPDU or a PPDU in a multi-frequency segment transmission mode, the transmit bandwidth includes at least two frequency segments, and the first PPDU is a sub-PPDU transmitted on any one of the at least two frequency segments in the aggregated PPDU or a PPDU transmitted on any one of the at least two frequency segments in the PPDU in the multi-frequency segment transmission mode. The processor is configured to determine, based on a frequency segment on which the communication apparatus parks and the transmit bandwidth carried in the first PPDU, a rotation coefficient of at least one field in an EHT-STF and an EHT-LTF that correspond to the frequency segment on which the communication apparatus parks.

In a possible design, the processor is configured to determine, based on a frequency segment on which the communication apparatus parks and a correspondence between each frequency segment in a 320 MHz bandwidth and a rotation coefficient, a rotation coefficient of at least one field in an EHT-STF and an EHT-LTF that correspond to the frequency segment on which the communication apparatus parks.

In a possible design, the transceiver is configured to receive an HE PPDU on a frequency segment on which the communication apparatus parks, where both rotation coefficients of an HE-STF and an HE-LTF that correspond to the frequency segment on which the communication apparatus parks are 1, and the HE PPDU is a sub-PPDU in an aggregated PPDU or a PPDU on a frequency segment in a PPDU in a multi-frequency segment transmission mode. The processor is configured to parse the received HE PPDU.

In a possible design, the transceiver is configured to receive an HE PPDU on a frequency segment on which the communication apparatus parks, where the HE PPDU is a sub-PPDU in an aggregated PPDU or a PPDU on a frequency segment in a PPDU in a multi-frequency segment transmission mode. The processor is configured to parse the received HE PPDU.

Optionally, the second communication device may further include a memory. The memory is coupled to the processor, and stores program instructions and data that are necessary for an AP MLD.

According to a twenty-fifth aspect, this disclosure provides a communication apparatus. The communication apparatus may exist in a product form of a chip, and a structure of the communication apparatus includes an input/output interface and a processing circuit. In a possible design, the processing circuit is configured to generate a first PPDU, where the first PPDU carries rotation coefficient indication information indicating a rotation coefficient of at least one field in an EHT-STF and an EHT-LTF that correspond to a frequency segment on which the first PPDU is transmitted, and the first PPDU is a sub-PPDU in an aggregated PPDU or a PPDU on a frequency segment in a PPDU in a multi-frequency segment transmission mode. The input/output interface is configured to transmit the first PPDU to a transceiver for sending.

In a possible design, the processing circuit is configured to generate a first PPDU, where the first PPDU carries a transmit bandwidth of an aggregated PPDU or a PPDU in a multi-frequency segment transmission mode, the transmit bandwidth includes at least two frequency segments, and the first PPDU is a sub-PPDU transmitted on any one of the at least two frequency segments in the aggregated PPDU or a PPDU transmitted on any one of the at least two frequency segments in the PPDU in the multi-frequency segment transmission mode. The input/output interface is configured to transmit the first PPDU to a transceiver for sending.

In a possible design, the processing circuit is configured to generate an HE PPDU, where the HE PPDU is a sub-PPDU in an aggregated PPDU or a PPDU on a frequency segment in a PPDU in a multi-frequency segment transmission mode. The input/output interface is configured to transmit the HE PPDU to a transceiver for sending.

In a possible design, the processing circuit is configured to: when rotation coefficients of an HE-STF and an HE-LTF that correspond to a frequency segment on which a second communication device parks are not 1, perform phase rotation on rotation coefficients of an STF and an LTF that correspond to all frequency segments on which an aggregated PPDU or a PPDU in a multi-frequency segment transmission mode is transmitted, so that both the rotation coefficients of the HE-STF and the HE-LTF that correspond to the frequency segment on which the second communication device parks change to 1. The processing circuit is further configured to generate an HE PPDU, and the HE PPDU is a sub-PPDU in the aggregated PPDU or the PPDU on the frequency segment in the PPDU in the multi-frequency segment transmission mode. The input/output interface is configured to transmit the HE PPDU to a transceiver for sending.

According to a twenty-sixth aspect, this disclosure provides a communication apparatus. The communication apparatus may exist in a product form of a chip, and a structure of the communication apparatus includes an input/output interface and a processing circuit. In a possible design, the input/output interface is configured to receive a first PPDU received by a receiver, where the first PPDU carries rotation coefficient indication information indicating a rotation coefficient of at least one field in an EHT-STF and an EHT-LTF that correspond to a frequency segment on which the first PPDU is transmitted, and the first PPDU is a sub-PPDU in an aggregated PPDU or a PPDU on a frequency segment in a PPDU in a multi-frequency segment transmission mode. The processing circuit is configured to parse the first PPDU, to obtain the rotation coefficient that is indicated by the rotation coefficient indication information and that is of the at least one field of the EHT-STF and the EHT-LTF corresponding to the frequency segment on which the first PPDU is transmitted.

In a possible design, the input/output interface is configured to receive a first PPDU received by a receiver, where the first PPDU carries a transmit bandwidth of an aggregated PPDU or a PPDU in a multi-frequency segment transmission mode, the transmit bandwidth includes at least two frequency segments, and the first PPDU is a sub-PPDU transmitted on any one of the at least two frequency segments in the aggregated PPDU or a PPDU transmitted on any one of the at least two frequency segments in the PPDU in the multi-frequency segment transmission mode. The processing circuit is configured to determine, based on a frequency segment on which the communication apparatus parks and the transmit bandwidth carried in the first PPDU, a rotation coefficient of at least one field in an EHT-STF and an EHT-LTF that correspond to the frequency segment on which the communication apparatus parks.

In a possible design, the processing circuit is configured to determine, based on a frequency segment on which the communication apparatus parks and a correspondence between each frequency segment in a 320 MHz bandwidth and a rotation coefficient, a rotation coefficient of at least one field in an EHT-STF and an EHT-LTF that correspond to the frequency segment on which the communication apparatus parks.

In a possible design, the input/output interface is configured to receive an HE PPDU received by a receiver on a frequency segment on which the communication apparatus parks, where both rotation coefficients of an HE-STF and an HE-LTF that correspond to the frequency segment on which the communication apparatus parks are 1, and the HE PPDU is a sub-PPDU in an aggregated PPDU or a PPDU on a frequency segment in a PPDU in a multi-frequency segment transmission mode. The processing circuit is configured to parse the received HE PPDU.

In a possible design, the input/output interface is configured to receive an HE PPDU received by a receiver on a frequency segment on which the communication apparatus parks, where the HE PPDU is a sub-PPDU in an aggregated PPDU or a PPDU on a frequency segment in a PPDU in a multi-frequency segment transmission mode. The processing circuit is configured to parse the received HE PPDU.

According to a twenty-seventh aspect, this disclosure provides a computer readable storage medium. The computer readable storage medium stores program instructions, and when the program instructions are run on a computer, the computer is enabled to perform the method according to the first aspect, the second aspect, the fifth aspect, the sixth aspect, the ninth aspect, the tenth aspect, the thirteenth aspect, the fifteenth aspect, the sixteenth aspect, the nineteenth aspect, or the twentieth aspect.

According to a twenty-eighth aspect, this disclosure provides a computer program product including program instructions. When the program instructions are run on a computer, the computer is enabled to perform the method according to the first aspect, the second aspect, the fifth aspect, the sixth aspect, the ninth aspect, the tenth aspect, the thirteenth aspect, the fifteenth aspect, the sixteenth aspect, the nineteenth aspect, or the twentieth aspect.

According to embodiments of this disclosure, when a transmitting end sends an aggregated PPDU or uses a multi-frequency segment transmission mode, rotation coefficients of an STF and an LTF that correspond to a frequency segment on which a receiving end parks can be correctly determined, thereby improving parsing correctness at the receiving end.

BRIEF DESCRIPTION OF DRAWINGS

To describe the technical solutions in embodiments of this disclosure more clearly, the following briefly describes the accompanying drawings used for describing the embodiments.

FIG. 5 is a schematic diagram of a PPDU in a multi-frequency segment transmission mode according to an embodiment of this disclosure;

FIG. 6 is a schematic diagram of a structure of a signaling part of a PPDU according to an embodiment of this disclosure;

FIG. 9 is a schematic diagram of a frame structure of an EHT PPDU according to an embodiment of this disclosure;

DESCRIPTION OF EMBODIMENTS

Figure 1:
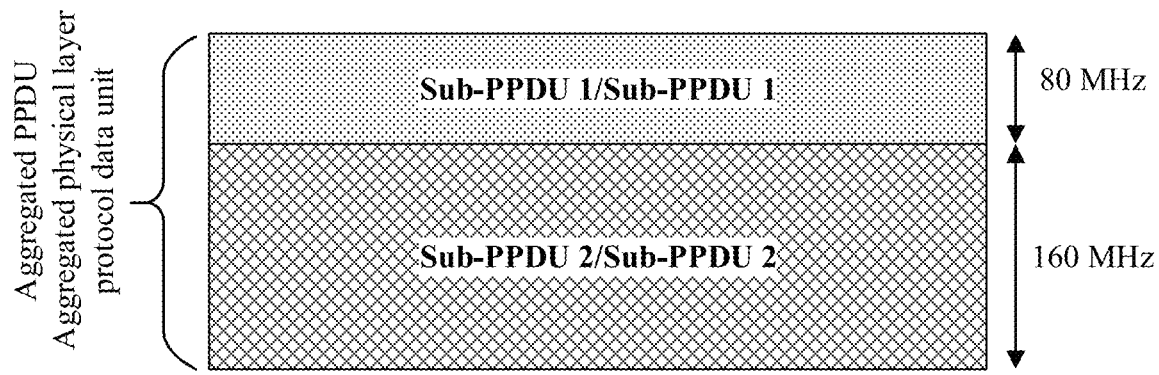
FIG. 1 is a schematic diagram of an aggregated PPDU.

The following clearly describes the technical solutions in embodiments of this disclosure with reference to the accompanying drawings in embodiments of this disclosure.

For ease of understanding the technical solutions in embodiments of this disclosure, the following briefly describes a system architecture of a PPDU transmission method provided in embodiments of this disclosure. It may be understood that the system architecture described in embodiments of this disclosure is intended to describe the technical solutions in embodiments of this disclosure more clearly, and do not constitute any limitation on the technical solutions provided in embodiments of this disclosure.

Embodiments of this disclosure provide a PPDU transmission method. The method may be applied to a wireless communication system. In an implementation, in the PPDU transmission method, rotation coefficients of an STF and/or an LTF corresponding to a frequency segment on which a PPDU is transmitted are explicitly carried in the PPDU, to determine rotation coefficients of an STF and an LTF that correspond to a frequency segment on which a receiving end parks, thereby improving correctness of parsing, based on the rotation coefficients, a PPDU transmitted on the frequency segment. In another implementation, in the PPDU transmission method, a transmit bandwidth of an aggregated PPDU or a PPDU in a multi-frequency segment transmission mode is carried in a PPDU, so that a receiving end determines a location, in the transmit bandwidth, of a frequency segment on which the receiving end parks, to determine rotation coefficients of an STF and an LTF that correspond to the frequency segment on which the receiving end parks, thereby improving correctness of parsing, based on the rotation coefficients, a PPDU transmitted on the frequency segment. In still another implementation, in the PPDU transmission method, a correspondence between each frequency segment in a 320 MHz bandwidth and a rotation coefficient is specified in a standard protocol, so that a receiving end determines rotation coefficients of an STF and an LTF that correspond to a frequency segment on which the receiving end parks, thereby improving correctness of parsing, based on the rotation coefficients, a PPDU transmitted on the frequency segment.

The wireless communication system may be a wireless local area network or a cellular network. The PPDU transmission method may be implemented by a communication device in the wireless communication system, or a chip or a processor in a communication device. The communication device may be an access point (access point, AP) device or a station (station, STA) device. Alternatively, the communication device may be a wireless communication device that supports parallel transmission on a plurality of links. For example, the communication device may be referred to as a multi-link device (multi-link device, MLD) or a multi-band device (multi-band device). Compared with a communication device that supports only single-link transmission, the multi-link device has higher transmission efficiency and a larger throughput rate.

Optionally, the PPDU transmission method provided in this embodiment of this disclosure may be applied to a scenario in which one node performs data transmission with one or more nodes, or may be applied to uplink/downlink transmission of a single user and uplink/downlink transmission of a plurality of users, or may be applied to device-to-device (device to device, D2D) transmission. The node may be an AP or a STA. When an AP communicates with a STA, or a STA communicates with a STA, an LTF sequence in a frame structure of a PPDU needs to be designed according to tone plans (tone plan) in 802.11be, and tone plans at 160 MHz and 320 MHz are repetitions of a tone plan at 80 MHz. For ease of description, the following uses communication between the AP and the STA as an example for description.

Figure 2:
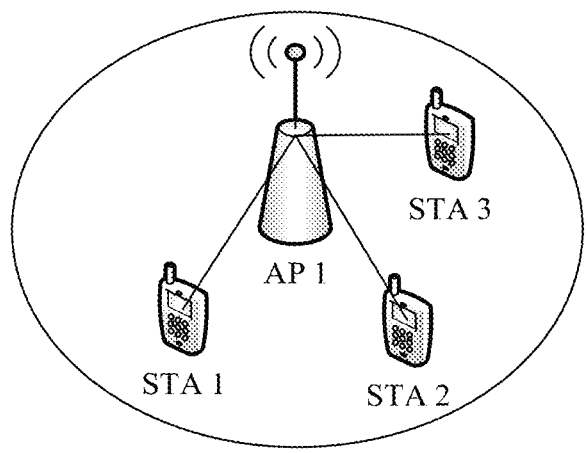
FIG. 2 is a schematic diagram of an architecture of a wireless communication system according to an embodiment of this disclosure.

FIG. 2 is a schematic diagram of an architecture of a wireless communication system according to an embodiment of this disclosure. As shown in FIG. 2, the wireless communication system may include one or more APs (for example, an AP 1 in FIG. 2) and one or more STAs (for example, a STA 1, a STA 2, and a STA 3 in FIG. 2). The AP and the STA support a WLAN communication protocol. The communication protocol may include the IEEE 802.11be (or referred to as the Wi-Fi 7 EHT protocol), and may further include protocols such as the IEEE 802.11ax and the IEEE 802.11ac. It is clear that with continuous evolution and development of communication technologies, the communication protocol may further include a next-generation protocol of IEEE 802.11be, and the like. A WLAN is used as an example. An apparatus for implementing the method in this disclosure may be an AP or a STA in the WLAN, or a chip or a processing system disposed in the AP or the STA.

An access point (for example, an AP 1 in FIG. 2) is an apparatus having a wireless communication function, supports communication using a WLAN protocol, capable of communicating with another device (for example, a station or another access point) in a WLAN network, and certainly capable of communicating with another device. In the WLAN system, the access point may be referred to as an access point station (AP STA). The apparatus having a wireless communication function may be an entire device, or may be a chip or a processing system installed in an entire device. A device in which the chip or the processing system is installed may implement the method and the function in embodiments of this disclosure under control of the chip or the processing system. The AP in embodiments of this disclosure is an apparatus that provides a service for a STA, and supports the 802.11 series protocols. For example, the AP may be a communication entity, for example, a communication server, a router, a switch, or a bridge. The AP may include a macro base station, a micro base station, a relay station, and the like in various forms. Certainly, the AP may alternatively be a chip or a processing system in these devices in various forms, to implement the method and the function in embodiments of this disclosure.

The station (for example, the STA 1 or the STA 2 in FIG. 2) is an apparatus having a wireless communication function, supports communication by using a WLAN protocol, and capable of communicating with another station or an access point in a WLAN network. In a WLAN system, the station may be referred to as a non-access point station (non-access point station, non-AP STA). For example, the STA is any user communication device that allows a user to communicate with an AP and further communicate with a WLAN. The apparatus having a wireless communication function may be an entire device, or may be a chip or a processing system installed in an entire device. A device in which the chip or the processing system is installed may implement the method and the function in embodiments of this disclosure under control of the chip or the processing system. For example, the STA may be user equipment that can connect to the internet, for example, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), or a mobile phone. Alternatively, the STA may be an internet of things node in the internet of things, an in-vehicle communication apparatus in the internet of vehicles, an entertainment device, a game device or system, a global positioning system device, or the like. The STA may alternatively be a chip and a processing system in the foregoing terminals.

The WLAN system can provide high-speed and low-latency transmission. With continuous evolution of WLAN application scenarios, the WLAN system is to be applied to more scenarios or industries, for example, the internet of things industry, the internet of vehicles industry, the banking industry, enterprise offices, exhibition halls of stadiums, concert halls, hotel rooms, dormitories, wards, classrooms, supermarkets, squares, streets, production workshops and warehousing. Certainly, a device (such as an access point or a station) that supports WLAN communication may be a sensor node (for example, a smart water meter, a smart electricity meter, or a smart air detection node) in smart city, a smart device (for example, a smart camera, a projector, a display, a television, a stereo, a refrigerator, or a washing machine) in smart home, a node in the internet of things, an entertainment terminal (for example, an AR, a VR, or another wearable device), a smart device (for example, a printer, a projector, a loudspeaker, or a stereo) in smart office, an internet of vehicles device in the internet of vehicles, an infrastructure (for example, a vending machine, a self-service navigation station of a supermarket, a self-service cash register device, or a self-service ordering machine) in daily life scenarios, a device in a large sports and music venue, and the like. Specific forms of the STA and the AP are not limited in embodiments of this disclosure, and are merely examples for description herein.

Figure 3A:
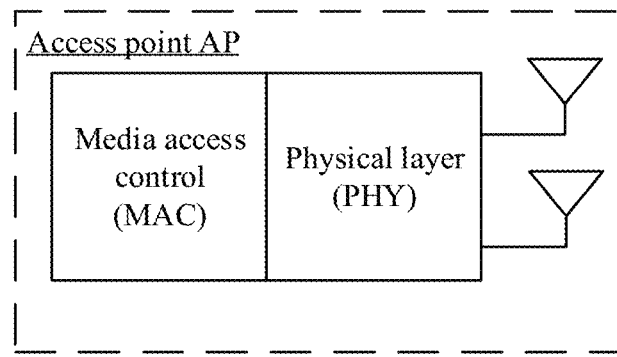
FIG. 3a is a schematic diagram of a structure of an access point according to an embodiment of this disclosure.
Figure 3B:
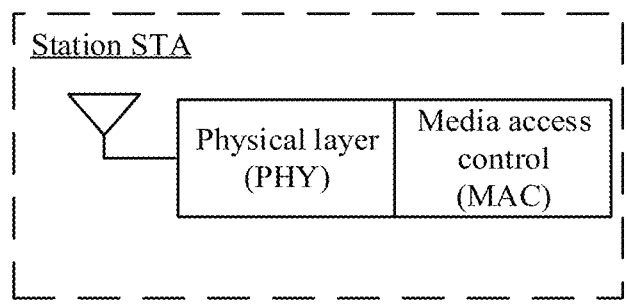
FIG. 3b is a schematic diagram of a structure of a station according to an embodiment of this disclosure.

Optionally, FIG. 3a is a schematic diagram of a structure of an access point according to an embodiment of this disclosure. The AP may have a plurality of antennas, or may have a single antenna. In FIG. 3a, the AP includes a physical layer (physical layer, PHY) processing circuit and a media access control (medium access control, MAC) processing circuit. The physical layer processing circuit may be configured to process a physical layer signal, and the MAC layer processing circuit may be configured to process a MAC layer signal. The 802.11 standard focuses on the PHY and the MAC. FIG. 3b is a schematic diagram of a structure of a station according to an embodiment of this disclosure. FIG. 3b is a schematic diagram of a structure of a STA with a single antenna. In an actual scenario, the STA may alternatively have a plurality of antennas, and may be a device with more than two antennas. In FIG. 3b, the STA may include a PHY processing circuit and a MAC processing circuit. The physical layer processing circuit may be configured to process a physical layer signal, and the MAC layer processing circuit may be configured to process a MAC layer signal.

The foregoing content briefly describes the system architecture in embodiments of this disclosure. To better understand the technical solutions in embodiments of this disclosure, the following describes some content related to this disclosure.

1. Frequency Segment (Frequency Segment)

In a WLAN, channels are usually classified into a primary channel and a secondary channel, and the secondary channel may include one or more sub-channels. If division is performed at a granularity of 20 MHz, a 320 MHz channel may be divided into 16 sub-channels.

The 16 sub-channels are sequentially numbered as a channel 1 to a channel 16, where each number represents a 20 MHz channel.

Figure 4:
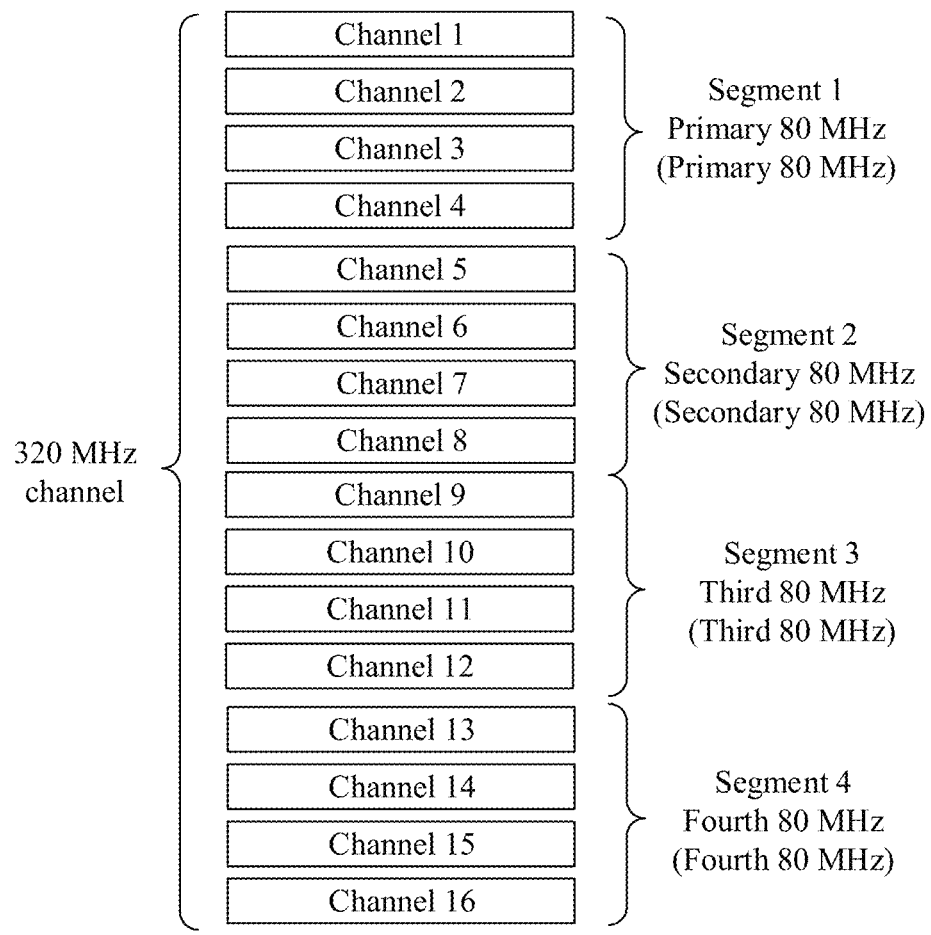
FIG. 4 is a schematic diagram of division into frequency segments on a 320 MHz channel according to an embodiment of this disclosure.

In a WLAN, a contiguous spectrum block for transmission may be referred to as a frequency segment (frequency segment). One WLAN channel may include a plurality of frequency segments, and a bandwidth of each frequency segment may be 80 MHz, 40 MHz, 20 MHz, or 160 MHz. FIG. 4 is a schematic diagram of division into frequency segments on a 320 MHz channel according to an embodiment of this disclosure. As shown in FIG. 4, using an example in which a bandwidth of a frequency segment is 80 MHz, the 320 MHz channel shown in FIG. 4 may be divided into four frequency segments. The frequency segment may alternatively be referred to as a frequency subblock, or referred to as a segment or subblock for short.

2. Multi-Frequency Segment (Multiple Frequency Segment) Transmission Mode

The multi-frequency segment transmission mode means that a plurality of PPDUs of a same standard are simultaneously/in parallel transmitted on a plurality of frequency segments. FIG. 5 is a schematic diagram of a PPDU in a multi-frequency segment transmission mode according to an embodiment of this disclosure. As shown in FIG. 5, an EHT PPDU 1 is transmitted on one 80 MHz frequency segment, and an EHT PPDU 2 is transmitted on another 80 MHz frequency segment.

3. Signal Fields (Signal Field, SIG) in Different Frequency Segments

In the 802.11ax protocol, a signaling part in a high efficiency physical layer protocol data unit (high efficiency physical protocol data unit, HE PPDU) needs to be repeatedly carried on each 20 MHz channel. When a bandwidth supported by a user in a WLAN is expanded from 160 MHz to 320 MHz, as a quantity of users (or stations) increases, signaling information of a plurality of users still needs to be repeatedly sent on each 20 MHz channel. As a result, excessive repeated signaling is caused, signaling overheads are relatively high, and transmission efficiency is low. To improve transmission efficiency and reduce signaling overheads, an improvement idea is to divide an entire large bandwidth (for example, 320 MHz) into several segments (segment), several stations park on each segment, and each segment transmits only signaling information of a station parking (parking) on the segment. Specifically, the parking (parking) is a correspondence determined or known by a system, and is semi-static. In other words, a correspondence between a frequency segment and one or more stations parking on the frequency segment is configured, and remains unchanged within a specific period of time.

It can be understood that a station parks (parking) on a frequency segment in this disclosure may also be that a station camps on (parking on) a frequency segment, or that a station is located in or belongs to a frequency segment.

To reduce overheads, in an example, FIG. 6 is a schematic diagram of a structure of a signaling part of a PPDU according to an embodiment of this disclosure. As shown in FIG. 6, the first segment is used as an example for description. An extremely high throughput physical layer protocol data unit (EHT PPDU) repeatedly carries a universal signal field (universal SIG, U-SIG) U-SIG 1 on four 20 MHz frequency subblocks on the first segment. The U-SIG 1 includes a transmission parameter of a station parking on the first segment, and does not need to include transmission parameters of all stations within an entire 320 MHz bandwidth, so that an amount of information of a U-SIG transmitted on each 20 MHz channel can be reduced. The EHT PPDU further repeatedly carries two content channels: an EHT-SIG 1_1 and an EHT-SIG 1_2, of the EHT-SIG on four 20 MHz frequency subblocks on the first segment. The EHT-SIG further includes other transmission parameters of the station parking on the first segment. For example, the EHT-SIG 1_1 includes some transmission parameters of the station parking on the first segment, and the EHT-SIG 1_2 includes other transmission parameters of the station parking on the first segment. Therefore, on one hand, a same U-SIG does not need to be repeatedly sent on each 20 MHz channel in the entire 320 MHz bandwidth, and only a same U-SIG needs to be repeatedly sent in each segment of the 320 MHz bandwidth. U-SIGs sent in different segments are different, thereby reducing a quantity of repetitions and also reducing an amount of information of the U-SIG. On the other hand, the two content channels of the EHT-SIG do not need to be repeatedly sent on the 320 MHz bandwidth, and only the two content channels of the EHT-SIG need to be repeatedly sent in each segment of the 320 MHz bandwidth. EHT-SIGs sent in different segments are different, thereby greatly reducing signaling overheads, shortening a quantity of symbols occupied by a signaling part, and improving transmission efficiency.

Optionally, the STA parking on (parking on) or operating on (operated on) the first segment may obtain data of the STA through parsing based on the U-SIG 1, the EHT-SIG 1_1, and the EHT-SIG 1_2.

It may be understood that both the U-SIG and the EHT-SIG are signal fields in the PPDU. The U-SIG carries some common information, for example, information indicating a PPDU version, uplink/downlink indication information, information indicating a frequency domain bandwidth of the PPDU, and puncturing indication information. The EHT-SIG includes information indicating resource allocation, information indicating data demodulation, and the like.

When an AP transmits a PPDU to a station parking on a frequency segment, a signal field of the PPDU is transmitted on the frequency segment on which the station parks, and a data field of the PPDU may be allocated to any location in an entire large bandwidth (for example, 320 MHz) for transmission. In other words, the station receives the signal field on the frequency segment on which the station parks, and receives the data field on one or more frequency segments based on an indication of the signal field. The one or more frequency segments may include the frequency segment on which the station parks, or may not include the frequency segment on which the station parks. In short, the frequency segment on which the station parks in this disclosure may be different from a band range used by the station to perform data transmission. For example, if the station parks on the second frequency segment of the 320 MHz channel shown in FIG. 4, the station receives a U-SIG and an EHT-SIG on the second frequency segment. It is assumed that the U-SIG indicates that a frequency domain bandwidth of the PPDU is 160 MHz. Then, the station receives, based on indications of the U-SIG and the EHT-SIG, a data field by using a 160 MHz bandwidth, and demodulates the data field based on data demodulation information indicated in the EHT-SIG.

4. Rotation Coefficient

Figures 7A, 7B:
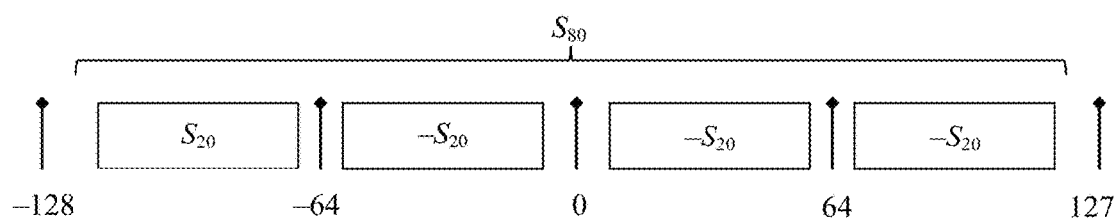
FIG. 7a is a schematic diagram of a frame structure of a PPDU in 802.11ac.
FIG. 7b is a schematic diagram of signal transmission within an 80 MHz bandwidth.

In 802.11ac, a 5G band is introduced, and a supported maximum bandwidth is expanded to 160 MHz. FIG. 7a is a schematic diagram of a frame structure of a PPDU in 802.11ac. As shown in FIG. 7a, the PPDU in 802.11ac includes a legacy short training field (legacy short training field, L-STF), a legacy long training field (legacy long training field, L-LTF), a legacy signal field (legacy signal field, L-SIG), a very high throughput signal field A (very high throughput signal field A, VHT-SIG-A), a very high throughput short training field (very high throughput short training field, VHT-STF), a very high throughput long training field (very high throughput long training field, VHT-LTF), a very high throughput signal field B (very high throughput signal field B, VHT-SIG-B), and a data (Data) field. The L-STF, the L-LTF, and the L-SIG may be understood as legacy preamble fields, for ensuring coexistence of a new device and a legacy device.

When a bandwidth of the PPDU in 802.11ac is 40 MHz, the L-STF, the L-LTF, the L-SIG, and the VHT-SIG-A in the PPDU in 802.11ac are replicated and transmitted on each 20 MHz channel, and a rotation coefficient the same as that of a 40 MHz bandwidth in 802.11n is used. To be specific, a signal transmitted on the second 20 MHz channel is multiplied by a rotation coefficient j, that is, the signal transmitted on the second 20 MHz channel is rotated by 90 degrees.

When a bandwidth of the PPDU in 802.11ac is 80 MHz, rotation coefficients of signals transmitted on the four 20 MHz channels are respectively [1 −1 −1 −1]. FIG. 7b is a schematic diagram of signal transmission within an 80 MHz bandwidth. As shown in FIG. 7b, assuming that a signal transmitted on the first 20 MHz channel is S20, a signal transmitted on the second 20 MHz channel is (−1)*S20, and signals transmitted on the third 20 MHz channel and the fourth 20 MHz channel are both (−1)*S20. −128, −64, 0, 64, and 127 in FIG. 7b are subcarrier numbers. The VHT-STF, the VHT-LTF, the VHT-SIG-B, and the data part in the PPDU in 802.11ac are transmitted within the entire 80 MHz bandwidth, and do not need to be replicated or transmitted on each 20 MHz channel like a legacy preamble field. However, to reduce a peak-to-average power ratio (peak-to-average power ratio, PAPR, PAPR for short), data whose subcarrier numbers range from −128 to −65 is multiplied by a rotation coefficient of 1, data whose subcarrier numbers range from −63 to −1 is multiplied by a rotation coefficient of −1, data whose subcarrier numbers range from 1 to 63 is multiplied by a rotation coefficient of −1, and data whose subcarrier numbers range from 65 to 127 is multiplied by a rotation coefficient of −1.

When a bandwidth of the PPDU in 802.11ac is contiguous 160 MHz, rotation coefficients of signals transmitted on the eight 20 MHz channels are respectively [1 −1 −1 −1 1 −1 −1 −1]. If the bandwidth of the PPDU in 802.11ac is noncontiguous 160 MHz, for example, two noncontiguous 80 MHz frequency subblocks, each 80 MHz frequency subblock uses a rotation coefficient when the bandwidth is 80 MHz, that is, each 80 MHz frequency subblock uses rotation coefficients [1 −1 −1 −1].

Because a supported maximum bandwidth in 802.11ax is the same as a supported maximum bandwidth in 802.11ac, rotation coefficients in bandwidths in 802.11ac are still used in 802.11ax.

It may be understood that the rotation coefficient in this disclosure may be used to modulate and demodulate the data part in the PPDU.

The EHT standard proposes an aggregated PPDU for physical layer packet aggregation, and further allows transmitting a PPDU in a multi-frequency segment transmission mode. In addition, the EHT standard allows frequency segments of different bandwidths, and a rotation coefficient is related to a bandwidth. Therefore, if a rotation coefficient at a transmitting end is not coordinated based on an entire bandwidth, a PAPR of a signal of the entire bandwidth is relatively high. For example, the aggregated PPDU in FIG. 1 and the PPDU in the multi-frequency segment transmission mode in FIG. 5 are used as examples. An entire bandwidth of the aggregated PPDU in FIG. 1 includes a bandwidth of a sub-PPDU 1 (sub-PPDU 1) and a bandwidth of a sub-PPDU 2 (sub-PPDU 2), that is, a sum of 80 MHz and 160 MHz is 240 MHz. An entire bandwidth of the PPDU in the multi-frequency segment transmission mode in FIG.

5 includes a bandwidth of an EHT PPDU 1 and a bandwidth of an EHT PPDU 2, that is, a sum of 80 MHz and 80 MHz is 160 MHz. Therefore, for a transmitting end, if a rotation coefficient is not coordinated based on the entire 240 MHz bandwidth, but the sub-PPDU 1 is modulated by using a rotation coefficient of the 80 MHz bandwidth, or the sub-PPDU 2 is modulated by using a rotation coefficient of the 160 MHz bandwidth, a PAPR of a signal of the entire 240 MHz bandwidth may be relatively high. In other words, because each frequency segment in the EHT standard may indicate a different bandwidth, if rotation coefficients of different frequency segments are not coordinated as a whole, a PAPR of the entire 240 MHz bandwidth is relatively high, thereby affecting communication performance.

In addition, for a receiving end, because both stations parking on different frequency segments and stations parking on a same frequency segment may be devices of different generations of standards, a station usually demodulates a received data field by using a rotation coefficient specified in a standard protocol (for example, 802.11ax) supported by the station. However, an AP (a transmitting end) may modulate the data field by using a rotation coefficient specified in a latest standard (for example, 802.11be). Therefore, when the station demodulates the received data field by using the rotation coefficient specified in 802.11ax, a demodulation error occurs. In other words, because the EHT standard allows use of a physical layer PPDU aggregation technology, the physical layer PPDU aggregation technology enables PPDUs of different protocols to be transmitted on different frequency segments. However, an old-protocol device demodulates, by using a rotation coefficient specified in the old protocol, a PPDU received on a frequency segment on which the device parks. As a result, data obtained through phase rotation is performed on the PPDU cannot be correctly received.

It can be understood that "demodulation" and "parsing" in this disclosure may be used interchangeably.

Therefore, according to the PPDU transmission method provided in embodiments of this disclosure, PAPRs of STF and LTF fields within an entire bandwidth can be reduced without affecting receiving of an old-standard device, to support a new feature of physical layer PPDU aggregation in 802.11be, and rotation coefficients of an STF and an LTF that correspond to a frequency segment on which a receiving end parks can be further correctly determined, thereby improving parsing correctness at the receiving end.

The following describes in detail the technical solutions provided in this disclosure with reference to more accompanying drawings.

The technical solutions provided in this disclosure are described in four embodiments. Embodiment 1 describes adding an indication of a rotation coefficient to a U-SIG or an EHT-SIG. Embodiment 2 describes how to ensure correct demodulation at a receiving end without modifying a signal field in a PPDU. Embodiment 3 describes adding an indication of entire bandwidth information to a U-SIG or an EHT-SIG. Embodiment 4 describes that regardless of a size of an entire bandwidth of a PPDU, each frequency segment is rotated based on a rotation coefficient corresponding to a fixed maximum bandwidth in a standard protocol. The following describes Embodiment 1 to Embodiment 3 in detail.

It may be understood that a first communication device mentioned in this disclosure may be an access point device, and a second communication device may be a station device. The first communication device may support a latest-generation standard protocol, such as the 802.11be protocol (or referred to as the Wi-Fi 7 EHT protocol), and the second communication device may support a protocol such as 802.11be, 802.11ax, or 802.11ac. It can be understood that the first communication device and the second communication device in embodiments of this disclosure may further support a next-generation protocol of IEEE 802.11be.

Embodiment 1

In Embodiment 1 of this disclosure, an indication of a rotation coefficient is added to a U-SIG or an EHT-SIG, to indicate a rotation coefficient corresponding to one of a plurality of frequency segments on which an aggregated PPDU or a PPDU in a multi-frequency segment transmission mode is transmitted. In this way, PAPRs of STF and LTF fields within an entire bandwidth can be reduced, and rotation coefficients of the STF and the LTF that correspond to a frequency segment on which a receiving end parks can be further correctly determined, thereby improving parsing correctness at the receiving end.

Figure 8:
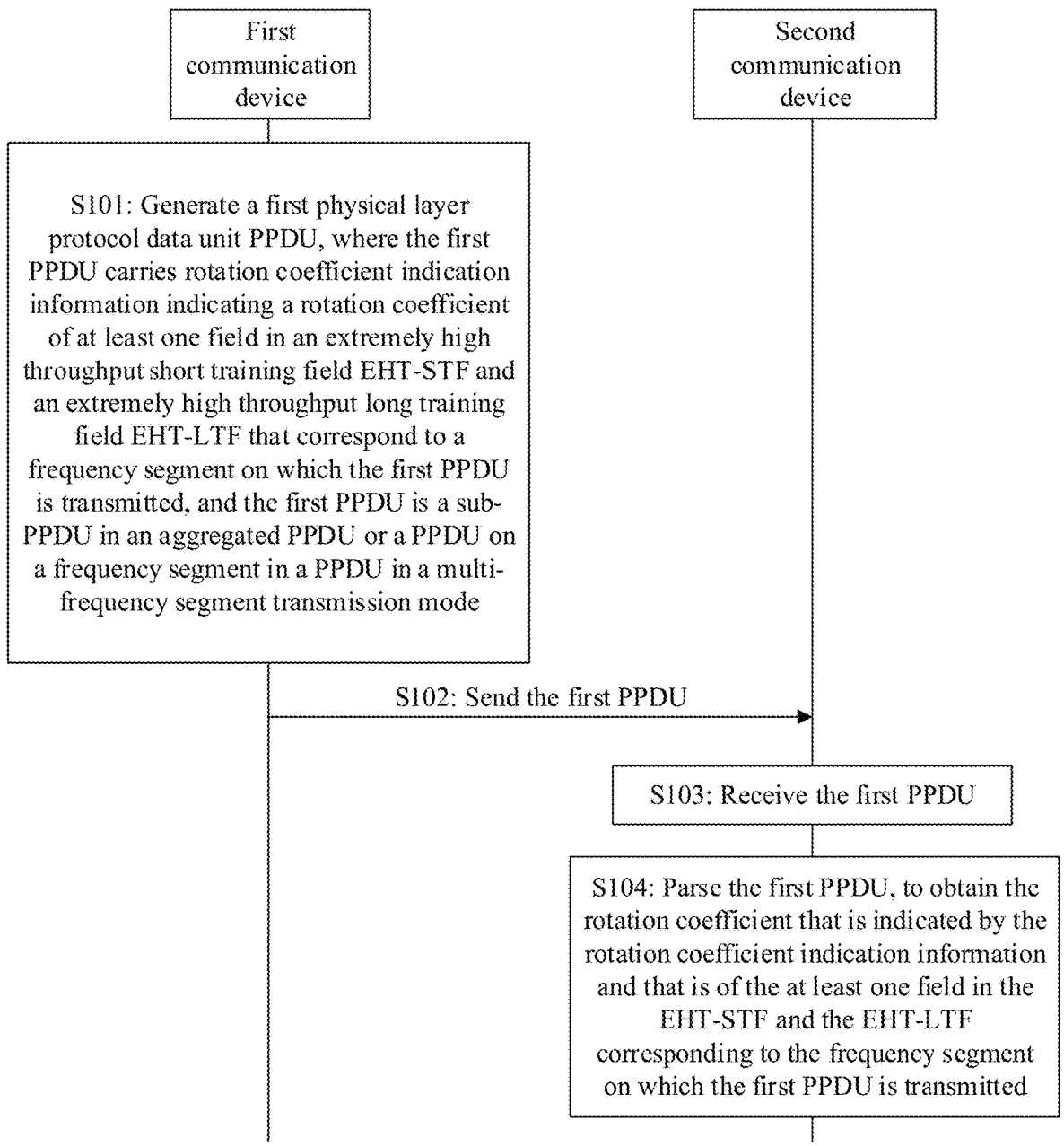
FIG. 8 is a schematic flowchart of a PPDU transmission method according to an embodiment of this disclosure.

FIG. 8 is a schematic flowchart of a PPDU transmission method according to an embodiment of this disclosure. As shown in FIG. 8, the PPDU transmission method includes but is not limited to the following steps.

S101: A first communication device generates a first physical layer protocol data unit PPDU, where the first PPDU carries rotation coefficient indication information indicating a rotation coefficient of at least one field in an extremely high throughput short training field EHT-STF and an extremely high throughput long training field EHT-LTF that correspond to a frequency segment on which the first PPDU is transmitted, and the first PPDU is a sub-PPDU in an aggregated PPDU or a PPDU on a frequency segment in a PPDU in a multi-frequency segment transmission mode.

S102: The first communication device sends the first PPDU.

The first PPDU may be any sub-PPDU in the aggregated PPDU, for example, the sub-PPDU 1 shown in FIG. 1, or the first PPDU may be the PPDU on the frequency segment in the PPDU in the multi-frequency segment transmission mode, for example, the EHT PPDU 1 shown in FIG. 5. The EHT PPDU is a PPDU in an EHT format. It may be understood that a channel bandwidth on which the aggregated PPDU is transmitted includes a plurality of frequency segments, and a channel bandwidth on which the PPDU in the multi-frequency segment transmission mode is transmitted also includes a plurality of frequency segments. One of the plurality of frequency segments is used to transmit the first PPDU.

A signal field of the first PPDU may carry rotation coefficient indication information, indicating a rotation coefficient of at least one field in an EHT-STF and an EHT-LTF that correspond to a frequency segment on which the first PPDU is transmitted. A rotation coefficient indicated in the rotation coefficient indication information is a segment of rotation coefficients in rotation coefficients corresponding to the channel bandwidth on which the aggregated PPDU (or the PPDU in the multi-frequency segment transmission mode) is transmitted. The segment of rotation coefficients corresponds to the frequency segment on which the first PPDU is transmitted.

It may be understood that the segment of rotation coefficients may have only one value, and not necessarily a plurality of values. This depends on specifications of rotation coefficients corresponding to channel bandwidths of various sizes in the 802.11be protocol.

For example, the aggregated PPDU in FIG. 1 is used as an example. A channel bandwidth of the aggregated PPDU is 240 MHz (that is, 80 MHz+160 MHz, and it is assumed that a frequency of a contiguous 80 MHz bandwidth is lower than a frequency of a contiguous 160 MHz bandwidth). The 240 MHz channel bandwidth includes one 80 MHz frequency segment and one 160 MHz frequency segment. It is assumed that rotation coefficients corresponding to the 240 MHz channel bandwidth are [x1 x2 x3 x4 x5 x6]. Correspondingly, rotation coefficients corresponding to the 240 MHz channel bandwidth may alternatively be divided into two segments of rotation coefficients (that is, [x1 x2] and [x3 x4 x5 x6]). The two segments of rotation coefficients respectively correspond to an 80 MHz frequency segment and a 160 MHz frequency segment. It is assumed that the first PPDU is the sub-PPDU 1 in FIG. 1, and the frequency segment on which the first PPDU is transmitted is the first 80 MHz frequency segment of the 240 MHz channel bandwidth. Therefore, the rotation coefficient indicated in the rotation coefficient indication information is a segment of rotation coefficients [x1 x2] in the rotation coefficients [x1 x2 x3 x4 x5 x6] corresponding to the 240 MHz channel bandwidth. It is assumed that the first PPDU is the sub-PPDU 2 in FIG. 1, and the frequency segment on which the first PPDU is transmitted is a 160 MHz frequency segment of the 240 MHz channel bandwidth. Therefore, the rotation coefficient indicated in the rotation coefficient indication information is a segment of rotation coefficients [x3 x4 x5 x6] in the rotation coefficients [x1 x2 x3 x4 x5 x6] corresponding to the 240 MHz channel bandwidth. A value of $x_i$ is 1 or −1, and i represents an $i^{th}$ element in a rotation coefficient corresponding to a channel bandwidth. It can be understood that the PPDU in the multi-frequency segment transmission mode is similar to the aggregated PPDU, and details are not described herein.

It can be learned that in this embodiment of this disclosure, overall coordination on rotation coefficients of a plurality of frequency segments is considered at a transmitting end, that is, a rotation coefficient corresponding to the channel bandwidth is used, so that PAPRs of STF and LTF fields within the entire bandwidth can be reduced, and system performance can be improved.

It may be understood that if a rotation coefficient of an EHT-STF is the same as a rotation coefficient of an EHT-LTF, the rotation coefficient indication information may indicate a rotation coefficient of either field of the EHT-STF and the EHT-LTF. If the rotation coefficient of the EHT-STF is different from the rotation coefficient of the EHT-LTF, the rotation coefficient indication information needs to separately indicate the rotation coefficient of the EHT-STF and the rotation coefficient of the EHT-LTF.

FIG. 9 is a schematic diagram of a frame structure of an EHT PPDU according to an embodiment of this disclosure. As shown in FIG. 9, the EHT PPDU includes an L-STF, an L-LTF, an L-SIG, a repeated legacy signal field (repeated legacy signal field, RL-SIG), a U-SIG, an extremely high throughput signal field (EHT-SIG), an EHT short training field (EHT-STF), an EHT long training field (EHT-LTF), and a data (Data) field. Optionally, the EHT PPDU further includes a packet extension field.

Optionally, the rotation coefficient indication information may be carried in a U-SIG or an EHT-SIG of the first PPDU.

S103: A second communication device receives the first PPDU.

S104: The second communication device parses the first PPDU, to obtain the rotation coefficient that is indicated by the rotation coefficient indication information and that is of the at least one field of the EHT-STF and the EHT-LTF corresponding to the frequency segment on which the first PPDU is transmitted.

A frequency segment on which the second communication device parks (parking) is a frequency segment on which the first PPDU is transmitted. The second communication device receives the first PPDU on the frequency segment on which the second communication device parks. The second communication device parses the first PPDU, to obtain the rotation coefficient that is indicated by the rotation coefficient indication information and that is of the at least one field of the EHT-STF and the EHT-LTF corresponding to the frequency segment on which the first PPDU is transmitted.

It may be understood that Embodiment 1 of this disclosure focuses on the signal field of the first PPDU. Therefore, step S101 to step S104 may be described as follows: Alternatively, a first communication device may generate a signal field of a first PPDU, where the signal field carries rotation coefficient indication information indicating a rotation coefficient of at least one field in an EHT-STF and an EHT-LTF that correspond to a frequency segment on which the signal field is transmitted, and the first PPDU is a sub-PPDU in an aggregated PPDU or a PPDU on a frequency segment in a PPDU in a multi-frequency segment transmission mode. The first communication device sends the signal field of the first PPDU on the frequency segment on which the signal field is transmitted. Alternatively, a second communication device may receive the signal field of the first PPDU on a frequency segment on which the second communication device parks, and parse the signal field, to obtain the rotation coefficient that is indicated by the signal field and that is of the at least one field of the EHT-STF and the EHT-LTF corresponding to the frequency segment on which the signal field is transmitted. The frequency segment on which the second communication device parks is the same as the frequency segment on which the signal field is transmitted.

Optionally, after obtaining the rotation coefficients of the EHT-STF and the EHT-LTF, the second communication device may receive and process the EHT-STF and EHT-LTF fields by using the rotation coefficients of the EHT-STF and the EHT-LTF. In this way, a subsequently received data field is correctly parsed to obtain data. The data (data obtained through demodulation at a receiving end) is consistent with pre-modulation data that a transmitting end (the first communication device) intends to send to the receiving end (the second communication device).

It can be learned that in this embodiment of this disclosure, an indication of the rotation coefficient is added to the U-SIG or the EHT-SIG, to indicate a rotation coefficient corresponding to one of a plurality of frequency segments on which the aggregated PPDU or the PPDU in the multi-frequency segment transmission mode is transmitted. A rotation coefficient of an entire bandwidth may be considered at a transmitting end, to reduce PAPRs of STF and LTF fields within the entire bandwidth and further improve correctness of parsing a data field at a receiving end. This is achieved because a correct rotation coefficient is used to demodulate the data field.

It may be understood that step S101 to step S104 are all described from the perspective of a PPDU on a frequency segment in the aggregated PPDU or the PPDU in the multi-frequency segment transmission mode. However, because Embodiment 1 of this disclosure focuses on the signal field in the PPDU, the technical solution provided in Embodiment 1 of this disclosure may also be described from another perspective. For example, description is provided from the perspective of the entire aggregated PPDU or the entire PPDU in the multi-frequency segment transmission mode, and focuses on a signal field on one of the frequency segments.

In an example, step S101 and step S102 may alternatively be described as follows: A first communication device generates a signal field of a PPDU, where a channel bandwidth on which the PPDU is transmitted includes at least two frequency segments, the at least two frequency segments include a first frequency segment, the signal field carries rotation coefficient indication information indicating a rotation coefficient of at least one field in an EHT-STF and an EHT-LTF that correspond to the first frequency segment. The first communication device sends the signal field on the first frequency segment.

Correspondingly, step S103 and step S104 may alternatively be described as follows: A second communication device receives the signal field of the PPDU on the first frequency segment, where the channel bandwidth on which the PPDU is transmitted includes the at least two frequency segments, the at least two frequency segments include the first frequency segment, the signal field carries the rotation coefficient indication information indicating the rotation coefficient of the at least one field of the EHT-STF and the EHT-LTF that correspond to the first frequency segment. The second communication device parses the signal field, to obtain the rotation coefficient of the at least one field of the EHT-STF and the EHT-LTF that correspond to the first frequency segment. The second communication device parks on the first frequency segment. The PPDU may be an aggregated PPDU or a PPDU in a multi-frequency segment transmission mode, for example, the aggregated PPDU shown in FIG. 1 or the PPDU in the multi-frequency segment transmission mode shown in FIG. 5.

Optionally, the signal field may be a U-SIG or an EHT-SIG.

It may be understood that for an implementation of this example, refer to corresponding implementations of step S101 to step S104. Details are not described herein.

It can be learned that in this example, an indication of a rotation coefficient corresponding to a frequency segment is added to the U-SIG or the EHT-SIG transmitted on the frequency segment. The frequency segment is one frequency segment in a channel bandwidth on which the entire aggregated PPDU or the entire PPDU in the multi-frequency segment transmission mode is transmitted. When a rotation coefficient of an entire bandwidth is considered, PAPRs of STF and LTF fields within the entire bandwidth can be reduced, and correctness of parsing a data field at a receiving end can be further improved. This is achieved because a correct rotation coefficient is used to demodulate the data field.

In an optional embodiment, rotation coefficients of various bandwidth sizes in the 802.11ax standard are different from rotation coefficients of various bandwidth sizes in the 802.11be standard. Therefore, to ensure that a device of the 802.11ax standard can normally operate in the 802.11be standard (for example, normally receive and send a PPDU), a frequency segment on which the device of the 802.11ax standard parks needs to be constrained. In other words, rotation coefficients of an HE-STF and an HE-LTF that correspond to the frequency segment on which the device of the 802.11ax standard parks need to be constrained.

Specifically, in an implementation, when the second communication device is a device of the 802.11ax standard or the second communication device operates in the 802.11ax protocol, the first communication device generates an HE PPDU. The HE PPDU is a sub-PPDU in an aggregated PPDU or a PPDU on a frequency segment in a PPDU in a multi-frequency segment transmission mode. The first communication device sends the HE PPDU. The second communication device receives the HE PPDU on a frequency segment on which the second communication device parks, and parses the HE PPDU. Both rotation coefficients of an HE-STF and an HE-LTF that correspond to the frequency segment on which the second communication device parks are 1. The first communication device is an EHT standard device. It can be learned that in this implementation, a device of the 802.11ax standard is limited to parking only on a frequency segment corresponding to a rotation coefficient of 1, so that receiving of an old-standard device may not be affected, thereby supporting a new feature of physical layer PPDU aggregation in 802.11be.

This implementation may be further described as follows: When the second communication device is a device of the 802.11ax standard (or a device operating in the 802.11ax protocol), the first communication device generates a signal field of a PPDU. A channel bandwidth on which the PPDU is transmitted includes at least two frequency segments, and the at least two frequency segments include a first frequency segment. The first communication device sends the signal field of the PPDU on the first frequency segment. The second communication device receives the signal field of the PPDU on the first frequency segment, and parses the signal field. Both rotation coefficients of an HE-STF and an HE-LTF that correspond to the first frequency segment are 1. The frequency segment on which the second communication device parks is the first frequency segment. The signal field is a signal field in an HE format, for example, an HE-SIG. The first communication device is an EHT standard device.

In another implementation, if the second communication device is a device of the 802.11ax standard or the second communication device operates in the 802.11ax protocol, but rotation coefficients of an HE-STF and an HE-LTF that correspond to a frequency segment on which the second communication device parks are not 1, the first communication device performs phase rotation, for example, multiplication by −1, on rotation coefficients of an STF and an LTF that correspond to all frequency segments (or a channel bandwidth) on which an aggregated PPDU or a PPDU in a multi-frequency segment transmission mode is transmitted, so that both the rotation coefficients of the HE-STF and the HE-LTF that correspond to the frequency segment on which the second communication device parks change to 1. The first communication device generates an HE PPDU. The HE PPDU is a sub-PPDU in an aggregated PPDU or a PPDU on a frequency segment in a PPDU in a multi-frequency segment transmission mode. The first communication device sends the HE PPDU. The second communication device receives the HE PPDU on the frequency segment on which the second communication device parks, and parses the HE PPDU. The first communication device is an EHT standard device.

For example, the aggregated PPDU in FIG. 1 is used as an example. A channel bandwidth of 240 MHz of the aggregated PPDU includes one 80 MHz frequency segment and one 160 MHz frequency segment. It is assumed that a frequency of a contiguous 80 MHz bandwidth is lower than a frequency of a contiguous 160 MHz bandwidth. It is assumed that rotation coefficients corresponding to the 240 MHz channel bandwidth are [x1 x2 x3 x4 x5 x6]. Correspondingly, rotation coefficients corresponding to the 240 MHz channel bandwidth may alternatively be divided into two segments of rotation coefficients (that is, [x1 x2] and [x3 x4 x5 x6]). The two segments of rotation coefficients respectively correspond to an 80 MHz frequency segment and a 160 MHz frequency segment. It is assumed that the frequency segment on which the second communication device parks is a 160 MHz frequency segment, and none of rotation coefficients [x3 x4 x5 x6] of an HE-STF and an HE-LTF that correspond to the 160 MHz frequency segment is 1, that is, values of x3, x4, x5, and x6 are all −1. In this case, in the first communication device, rotation coefficients [x1 x2 x3 x4 x5 x6] corresponding to the 240 MHz channel bandwidth may be multiplied by −1, to obtain rotation coefficients [—x1 −x2 −x3 −x4 −x5 −x6], so that all the rotation coefficients ([x3 x4 x5 x6]) of the HE-STF and the HE-LTF that correspond to the frequency segment on which the second communication device parks change to 1.

This implementation may be further described as follows: When the rotation coefficients of an HE-STF and an HE-LTF that correspond to a frequency segment on which the second communication device parks are not 1, the first communication device performs phase rotation on rotation coefficients of an STF and an LTF that correspond to a channel bandwidth on which a PPDU is transmitted, so that both rotation coefficients of an HE-STF and an HE-LTF that correspond to a first frequency segment on which the second communication device parks change to 1. The channel bandwidth on which the PPDU is transmitted includes at least two frequency segments. The at least two frequency segments include the first frequency segment. The first communication device generates a signal field corresponding to the first frequency segment, and sends the signal field on the first frequency segment. The second communication device receives the signal field on the first frequency segment, and parses the signal field. The signal field is a signal field in an HE format, for example, an HE-SIG.

It can be learned that in this implementation, rotation coefficients corresponding to all frequency segments (or a channel bandwidth) on which an aggregated PPDU or a PPDU in a multi-frequency segment transmission mode is transmitted are multiplied by −1, so that both the rotation coefficients of the HE-STF and the HE-LTF that correspond to the frequency segment on which the second communication device parks change to 1. This may not affect a PAPR within the channel bandwidth, and does not affect receiving of an old standard device.

Embodiment 2

Figure 10:
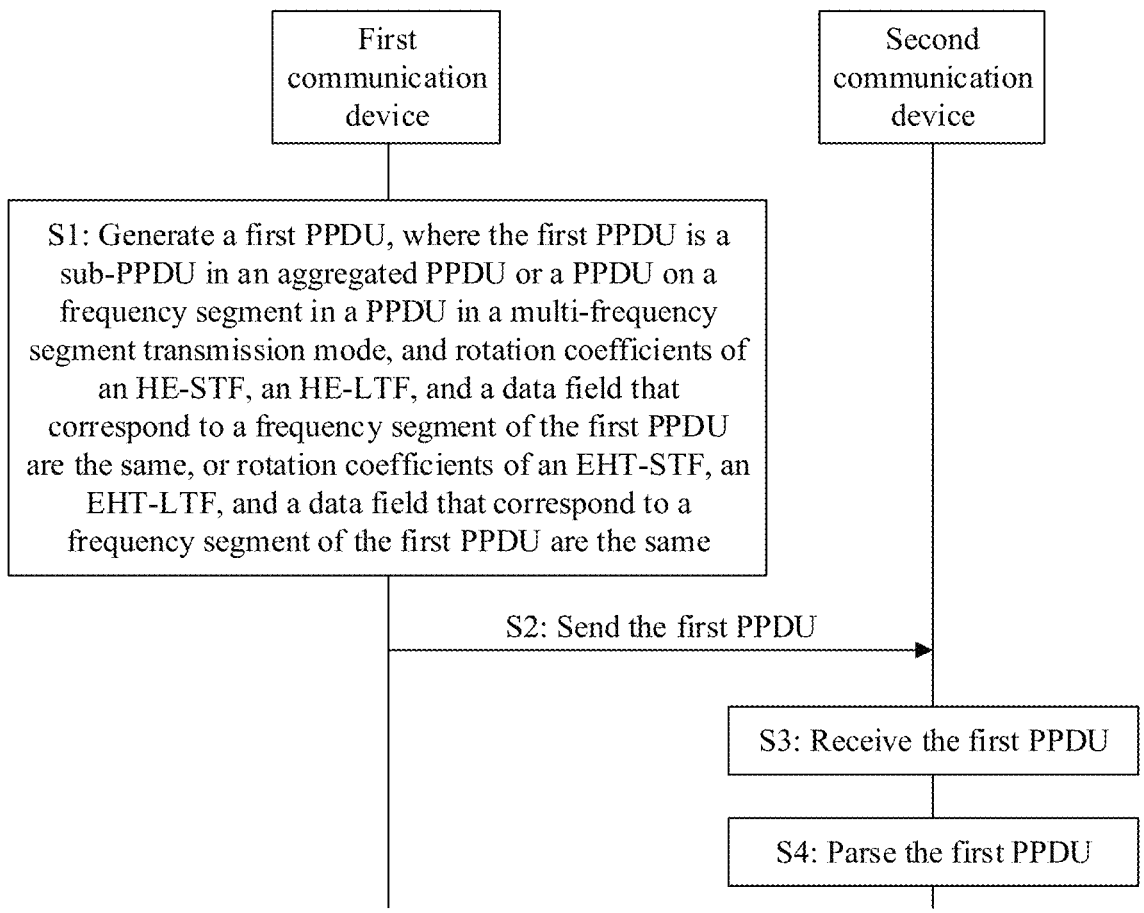
FIG. 10 is another schematic flowchart of a PPDU transmission method according to an embodiment of this disclosure.

FIG. 10 is another schematic flowchart of a PPDU transmission method according to an embodiment of this disclosure. As shown in FIG. 10, the PPDU transmission method includes but is not limited to the following steps.

S1: A first communication device generates a first PPDU, where the first PPDU is a sub-PPDU in an aggregated PPDU or a PPDU on a frequency segment in a PPDU in a multi-frequency segment transmission mode, and rotation coefficients of an HE-STF, an HE-LTF, and a data field that correspond to a frequency segment of the first PPDU are the same, or rotation coefficients of an EHT-STF, an EHT-LTF, and a data field that correspond to a frequency segment of the first PPDU are the same.

S2: The first communication device sends the first PPDU.

The first PPDU may be any sub-PPDU in the aggregated PPDU, for example, the sub-PPDU 1 shown in FIG. 1, or the first PPDU may be a PPDU on a frequency segment in a PPDU in a multi-frequency segment transmission mode, for example, the EHT PPDU 1 shown in FIG. 5.

The sub-PPDU may be an EHT PPDU or an HE PPDU, or the first PPDU is an EHT PPDU or an HE PPDU. Certainly, the sub-PPDU may alternatively be a PPDU in one or more future generations of standards, for example, a PPDU in Wi-Fi 8 or Wi-Fi 9. It may be understood that a channel bandwidth on which the aggregated PPDU is transmitted includes a plurality of frequency segments, and a channel bandwidth on which the PPDU in the multi-frequency segment transmission mode is transmitted also includes a plurality of frequency segments. One of the plurality of frequency segments is used to transmit the first PPDU. For ease of description in this embodiment of this disclosure, a frequency segment on which the first PPDU is transmitted is referred to as a frequency segment of the first PPDU.

Optionally, rotation coefficients of an HE-STF, an HE-LTF, and a data field that correspond to the frequency segment of the first PPDU are the same, or rotation coefficients of an EHT-STF, an EHT-LTF, and a data field that correspond to the frequency segment of the first PPDU are the same. In the first communication device (a transmitting end), the HE/EHT-STF, the HE/EHT-LTF, and the data field may be processed by using the rotation coefficients. For example, frequency domain signals corresponding to the HE/EHT-STF, the HE/EHT-LTF, and the data field are rotated by a specified phase based on the rotation coefficients. The rotation coefficient herein may be a vector, and the vector includes one or more elements. For example, the rotation coefficients of the HE/EHT-STF, the HE/EHT-LTF, and the data field that correspond to the frequency segment on which the first PPDU is transmitted are all [x1 x2]. Alternatively, the rotation coefficients of the HE/EHT-STF, the HE/EHT-LTF, and the data field that correspond to the frequency segment on which the first PPDU is transmitted are all [x1]. It can be understood that a value of x1 may be −1 or 1, and a value of x2 may also be −1 or 1. Certainly, values of x1 and x2 may alternatively be other values. Specific values of the rotation coefficients are not limited in this embodiment of this disclosure.

It can be further understood that if the first PPDU is an HE PPDU, correspondingly, the first PPDU includes an HE-STF and an HE-LTF. Similarly, if the first PPDU is an EHT PPDU, correspondingly, the first PPDU includes an EHT-STF and an EHT-LTF. Certainly, if the first PPDU is a PPDU of a future-generation standard, the first PPDU correspondingly includes an STF and an LTF of this generation standard. In other words, this embodiment of this disclosure is not only applicable to the 802.11be standard and the 802.11ax standard, but also applicable to one or more future generations of standards.

Optionally, every 20 MHz, 40 MHz, 80 MHz, or 160 MHz in the HE/EHT-STF, the HE/EHT-LTF, and the data field that correspond to the frequency segment of the first PPDU corresponds to one rotation coefficient. For example, the frequency segment on which the first PPDU is transmitted is 160 MHz. Assuming that each 20 MHz corresponds to one rotation coefficient, the rotation coefficients of the HE/EHT-STF, the HE/EHT-LTF, and the data field that correspond to the frequency segment of the first PPDU are [x1 x2 x3 x4 x5 x6 x7 x8]. x1, x2, x3, x4, x5, x6, x7, and x8 respectively correspond to eight 20 MHz frequency subblocks in ascending order (or descending order) of frequencies in 160 MHz. x1 to x8 may be partially the same, or may be completely the same, or may be completely different. Assuming that each 40 MHz corresponds to one rotation coefficient, the rotation coefficients of the HE/EHT-STF, the HE/EHT-LTF, and the data field that correspond to the frequency segment of the first PPDU are [x1 x2 x3 x4]. x1, x2, x3, and x4 respectively correspond to four 40 MHz frequency subblocks in ascending order (or descending order) of frequencies in 160 MHz. x1 to x4 may be partially the same, or may be completely the same, or may be completely different. Assuming that each 80 MHz corresponds to one rotation coefficient, the rotation coefficients of the HE/EHT-STF, the HE/EHT-LTF, and the data field that correspond to the frequency segment of the first PPDU are [x1 x2]. x1 and x2 respectively correspond to two 80 MHz frequency subblocks in ascending order (or descending order) of frequencies in 160 MHz. x1 and x2 may be partially the same, or may be completely the same, or may be completely different. Assuming that each 160 MHz corresponds to one rotation coefficient, the rotation coefficients of the HE/EHT-STF, the HE/EHT-LTF, and the data field that correspond to the frequency segment of the first PPDU are [x1]. x1 corresponds to 160 MHz. The same applies to a 320 MHz bandwidth, and details are not described herein.

It can be understood that the foregoing "each 40 MHz corresponds to one rotation coefficient" may alternatively be understood as that rotation coefficients corresponding to two 20 MHz bandwidths within each 40 MHz are the same. Similarly, "each 80 MHz corresponds to one rotation coefficient" may be understood as that rotation coefficients corresponding to two 40 MHz bandwidths or four 20 MHz bandwidths within each 80 MHz are the same. Similarly, "each 160 MHz corresponds to one rotation coefficient" may be understood as that rotation coefficients corresponding to two 80 MHz bandwidths, four 40 MHz bandwidths, or eight 20 MHz bandwidths within each 160 MHz are the same.

Optionally, the signal field (herein referred to as a signal field preceding the HE/EHT-STF) of the first PPDU and the subsequent HE/EHT-STF, HE/EHT-LTF, and data field may have different rotation coefficients. Rotation coefficients in different bandwidths may be specified in a standard or determined by the transmitting end (the first communication device) from a signal on an entire bandwidth. The transmitting end (the first communication device) generates and transmits, according to specifications in the standard, a PPDU (the first PPDU) on which phase rotation is performed.

S3: A second communication device receives the first PPDU.

S4: The second communication device parses the first PPDU.

A frequency segment on which the second communication device parks (parking) is a frequency segment on which the first PPDU is transmitted. The second communication device receives the first PPDU on the frequency segment on which the second communication device parks. The second communication device parses the first PPDU to restore original data. In an example, the second communication device obtains a channel estimation result based on the HE/EHT-LTF. The channel estimation result includes phase rotation information corresponding to each frequency segment, and then demodulates a corresponding data field based on the channel estimation result. Because channel estimation information (such as the HE/EHT-LTF) and the data field include a same rotation coefficient, and are rotated by a same phase, the channel estimation information and the data field may cancel each other in a demodulation process, to restore original data. The original data herein may be understood as pre-modulation data at a transmitting end (the first communication device).

It can be learned that in this embodiment of this disclosure, the HE/EHT-STF, the HE/EHT-LTF, and the data field in the aggregated PPDU are rotated by a same phase (or multiplied by a same rotation coefficient) based on a frequency segment. A rotation coefficient of an entire bandwidth may be considered at a transmitting end, to reduce PAPRs of an STF and an LTF within the entire bandwidth, and further improve correctness of parsing the data field at a receiving end because the STF, the LTF, and the data field are rotated by the same phase (or multiplied by the same rotation coefficient), and demodulation of the data field is not affected. In addition, in this embodiment of this disclosure, signaling information does not need to be added to the PPDU to indicate the rotation coefficient, so that signaling overheads can be reduced.

Embodiment 3

In Embodiment 3 of this disclosure, an indication of a transmit bandwidth is added to a U-SIG or an EHT-SIG, to indicate a transmit bandwidth (or a channel bandwidth or an entire bandwidth) on which an aggregated PPDU or a PPDU in a multi-frequency segment transmission mode is transmitted, so that a receiving end determines, based on a frequency segment on which the receiving end parks and the transmit bandwidth, rotation coefficients of an EHT-STF and an EHT-LTF that correspond to the frequency segment on which the receiving end parks. In this way, PAPRs of STF and the LTF fields in the entire bandwidth can be reduced, and rotation coefficients of an STF and an LTF that correspond to the frequency segment on which the receiving end parks can be further correctly determined, thereby improving parsing correctness at the receiving end.

Figures 11, 12:
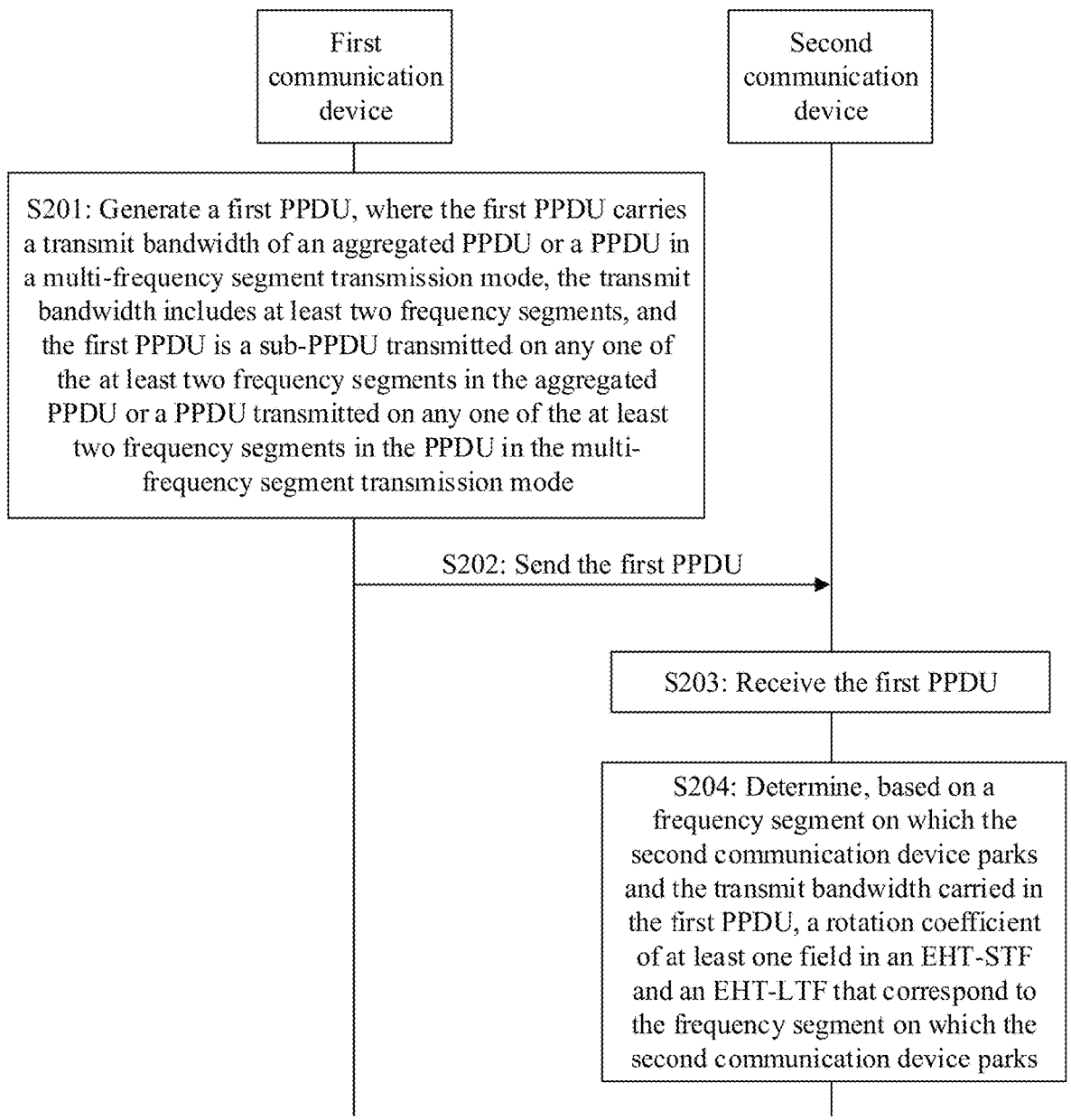
FIG. 11 is still another schematic flowchart of a PPDU transmission method according to an embodiment of this disclosure.
FIG. 12 is yet another schematic flowchart of a PPDU transmission method according to an embodiment of this disclosure.

FIG. 11 is still another schematic flowchart of a PPDU transmission method according to an embodiment of this disclosure. As shown in FIG. 11, the PPDU transmission method includes but is not limited to the following steps.

S201: A first communication device generates a first PPDU, where the first PPDU carries a transmit bandwidth of an aggregated PPDU or a PPDU in a multi-frequency segment transmission mode, the transmit bandwidth includes at least two frequency segments, and the first PPDU is a sub-PPDU transmitted on any one of the at least two frequency segments in the aggregated PPDU or a PPDU transmitted on any one of the at least two frequency segments in the PPDU in the multi-frequency segment transmission mode.

S202: The first communication device sends the first PPDU.

The first PPDU may be any sub-PPDU transmitted in the aggregated PPDU, for example, the sub-PPDU 1 shown in FIG. 1, or the first PPDU may be a PPDU transmitted on a frequency segment in a PPDU in a multi-frequency segment transmission mode, for example, the EHT PPDU 1 shown in FIG. 5. The EHT PPDU is a PPDU in an EHT format.

The signal field of the first PPDU may carry the transmit bandwidth of the aggregated PPDU or the PPDU in the multi-frequency segment transmission mode, and the transmit bandwidth includes at least two frequency segments. For example, using FIG. 1 as an example, the transmit bandwidth is a sum of bandwidths of the sub-PPDU 1 and the sub-PPDU 2, that is, a sum of 80 MHz and 160 MHz is 240 MHz. Using FIG. 5 as an example, the transmit bandwidth is a sum of bandwidths of PPDUs transmitted on all frequency segments, that is, 160 MHz. One of the at least two frequency segments is used to transmit the first PPDU. In other words, the first PPDU is a sub-PPDU transmitted on a frequency segment of the transmit bandwidth in the aggregated PPDU, or the first PPDU is a PPDU transmitted on a frequency segment of the transmit bandwidth in the PPDU in the multi-frequency segment transmission mode.

Optionally, the signal field of the first PPDU may be a U-SIG or an EHT-SIG, that is, the U-SIG or the EHT-SIG carries the transmit bandwidth. In other words, the U-SIG or the EHT-SIG is transmitted on a frequency segment of the transmit bandwidth, and only information about a station parking on the frequency segment is transmitted. The U-SIG or the EHT-SIG may further carry a bandwidth on which the frequency segment of the first PPDU is transmitted.

S203: A second communication device receives the first PPDU.

S204: The second communication device determines, based on a frequency segment on which the second communication device parks and the transmit bandwidth carried in the first PPDU, a rotation coefficient of at least one field in an EHT-STF and an EHT-LTF that correspond to the frequency segment on which the second communication device parks.

The frequency segment on which the second communication device parks (parking) is a frequency segment on which the first PPDU is transmitted. The second communication device receives the first PPDU on the frequency segment on which the second communication device parks. The second communication device may determine, based on the transmit bandwidth carried in the first PPDU, a location, in the transmit bandwidth, of the frequency segment on which the second communication device parks, and a rotation coefficient corresponding to the transmit bandwidth, the rotation coefficient of the at least one field of the EHT-STF and the EHT-LTF that correspond to the frequency segment on which the second communication device parks. The rotation coefficient corresponding to the frequency segment on which the second communication device parks is a segment of rotation coefficients in rotation coefficients corresponding to the transmit bandwidth. The rotation coefficients corresponding to the transmit bandwidth may be specified in a standard protocol. In other words, rotation coefficients of various bandwidth sizes, for example, rotation coefficients of 80 MHz, 160 MHz, and 320 MHz bandwidths, are specified in the standard protocol.

It can be learned that in this embodiment of this disclosure, overall coordination on rotation coefficients of a plurality of frequency segments is considered at a transmitting end, that is, a rotation coefficient corresponding to the channel bandwidth is used, so that PAPRs of STF and LTF fields within the entire bandwidth can be reduced, and system performance can be improved. Correspondingly, rotation coefficients that correspond to a frequency segment on which a receiving end parks and that is determined at the receiving end is a segment of rotation coefficients in the rotation coefficients corresponding to the transmit bandwidth, to ensure correctness of rotation coefficients of an STF and an LTF that correspond to the frequency segment on which the receiving end parks, thereby improving parsing correctness at the receiving end.

For example, the PPDU in the multi-frequency segment transmission mode in FIG. 5 is used as an example. A transmit bandwidth of the PPDU in the multi-frequency segment transmission mode is 160 MHz, and includes two 80 MHz frequency segments. Assuming that the second communication device parks on the third 80 MHz frequency segment of a 320 MHz channel, the second communication device determines an overall rotation coefficient in an entire 160 M bandwidth based on the 160 MHz transmit bandwidth and specifications in a standard, and then determines, based on a location, in the 160 MHz transmit bandwidth, of a frequency segment on which the second communication device parks, a rotation coefficient corresponding to the 80 MHz frequency segment on which the second communication device parks. It is assumed that rotation coefficients corresponding to the 160 MHz transmit bandwidth are [x1 x2 x3 x4], and the rotation coefficients corresponding to the 160 MHz transmit bandwidth may be correspondingly divided into two segments, and the two segments respectively correspond to two 80 MHz frequency segments. It can be learned from a channel plan (channel plan) in the EHT standard that the 160 MHz transmit bandwidth can include only the first 80 MHz frequency segment and the second 80 MHz frequency segment of the 320 MHz channel, or include the third 80 MHz frequency segment and the fourth 80 MHz frequency segment of the 320 MHz channel. Because the second communication device parks on the third 80 MHz frequency segment of the 320 MHz channel, the 160 MHz transmit bandwidth can include only the third 80 MHz frequency segment and the fourth 80 MHz frequency segment of the 320 MHz channel. Therefore, the frequency segment on which the second communication device parks is the first frequency segment in the 160 MHz transmit bandwidth. Therefore, the rotation coefficients of the EHT-STF and the EHT-LTF that correspond to the frequency segment on which the second communication device parks are a segment of rotation coefficients, that is, [x1 x2] that corresponds to the 80 MHz frequency segment on which the second communication device parks and that is in the rotation coefficients [x1 x2 x3 x4] corresponding to the 160 MHz transmit bandwidth. A value of xi is 1 or −1, and i represents an $i^{th}$ element in the rotation coefficient corresponding to the transmit bandwidth. It can be understood that the aggregated PPDU is similar to the PPDU in the multi-frequency segment transmission mode, and details are not described herein.

In other words, after the second communication device receives an indication of the entire bandwidth (the transmit bandwidth) on the frequency segment on which the second communication device parks, the second communication device may determine the rotation coefficients of the EHT-STF and the EHT-LTF in the frequency segment based on the entire bandwidth and the location of the frequency segment on which the second communication device parks.

It may be understood that Embodiment 2 of this disclosure focuses on the signal field of the first PPDU. Therefore, step S201 to step S204 may be described as follows: Alternatively, a first communication device may generate a signal field of a first PPDU, where the signal field carries a transmit bandwidth of an aggregated PPDU or a PPDU in a multi-frequency segment transmission mode, the transmit bandwidth includes at least two frequency segments, the at least two frequency segments include a first frequency segment, and the first PPDU is a sub-PPDU transmitted on the first frequency segment or a PPDU transmitted on the first frequency segment in the PPDU in the multi-frequency segment transmission mode. The first communication device sends the signal field of the first PPDU on the first frequency segment. Alternatively, a second communication device receives the signal field of the first PPDU on a frequency segment on which the second communication device parks, and determines, based on the frequency segment on which the second communication device parks and the transmit bandwidth carried in the signal field, a rotation coefficient of at least one field in an EHT-STF and an EHT-LTF that correspond to the frequency segment on which the second communication device parks. The frequency segment on which the second communication device parks is the same as the first frequency segment.

Optionally, after obtaining the rotation coefficients of the EHT-STF and the EHT-LTF, the second communication device may receive and process the EHT-STF and EHT-LTF fields by using the rotation coefficients of the EHT-STF and the EHT-LTF. In this way, a subsequently received data field is correctly parsed to obtain data. The data (data obtained through demodulation at a receiving end) is consistent with pre-modulation data that a transmitting end (the first communication device) intends to send to the receiving end (the second communication device).

It can be learned that in this embodiment of this disclosure, an indication of the transmit bandwidth is added to the U-SIG or the EHT-SIG to indicate the transmit bandwidth (or the channel bandwidth or the entire bandwidth) on which the aggregated PPDU or the PPDU in the multi-frequency segment transmission mode is transmitted, so that after receiving the transmit bandwidth, the receiving end determines, based on a location, in the transmit bandwidth, of a frequency segment on which the receiving end parks, rotation coefficients of an EHT-STF and an EHT-LTF that correspond to the frequency segment on which the receiving end parks. A rotation coefficient of the entire bandwidth may be considered at the transmitting end, to reduce PAPRs of STF and LTF fields within the entire bandwidth and further improve correctness of parsing a data field at a receiving end. This is achieved because a correct rotation coefficient is used to demodulate the data field.

It may be understood that step S201 to step S204 are all described from the perspective of a PPDU on a frequency segment in the aggregated PPDU or the PPDU in the multi-frequency segment transmission mode. However, because Embodiment 2 of this disclosure focuses on the signal field in the PPDU, the technical solution provided in Embodiment 2 of this disclosure may also be described from another perspective. For example, description is provided from the perspective of the entire aggregated PPDU or the entire PPDU in the multi-frequency segment transmission mode, and focuses on a signal field on one of the frequency segments.

In an example, step S201 and step S202 may alternatively be described as follows: A first communication device generates a signal field of a PPDU, where a channel bandwidth on which the PPDU is transmitted includes at least two frequency segments, the at least two frequency segments include a first frequency segment, the signal field carries the channel bandwidth. The first communication device sends the signal field on the first frequency segment.

Correspondingly, step S203 and step S204 may alternatively be described as: A second communication device receives the signal field of the PPDU on the first frequency segment, where the channel bandwidth on which the PPDU is transmitted includes the at least two frequency segments, the at least two frequency segments include the first frequency segment, and the signal field carries the channel bandwidth. The second communication device determines, based on the channel bandwidth carried in the signal field and the first frequency segment, rotation coefficients of an EHT-STF and an EHT-LTF that correspond to the first frequency segment. The second communication device parks on the first frequency segment. The PPDU may be an aggregated PPDU or a PPDU in a multi-frequency segment transmission mode, for example, the aggregated PPDU shown in FIG. 1 or the PPDU in the multi-frequency segment transmission mode shown in FIG. 5. A size of the channel bandwidth on which the PPDU is transmitted is the same as a size of a bandwidth used for transmitting the entire aggregated PPDU, or a size of a bandwidth used for transmitting the entire PPDU in the multi-frequency segment transmission mode. For example, using FIG. 1 as an example, the channel bandwidth is a sum of bandwidths of the sub-PPDU 1 and the sub-PPDU 2, that is, a sum of 80 MHz and 160 MHz is 240 MHz. Using FIG. 5 as an example, the channel bandwidth is a sum of bandwidths of PPDUs transmitted on all frequency segments, that is, 160 MHz.

It may be understood that the channel bandwidth in this example is the same as the transmit bandwidth mentioned in step S201 to step S204, and has a same meaning.

Optionally, the signal field may be a U-SIG or an EHT-SIG. The U-SIG or the EHT-SIG may further carry a bandwidth of the first frequency segment.

It may be understood that for an implementation of this example, refer to corresponding implementations of step S201 to step S204. Details are not described herein.

It can be learned that in this embodiment of this disclosure, an indication of the transmit bandwidth is added to the U-SIG or the EHT-SIG to indicate the channel bandwidth (or the entire bandwidth) on which the entire aggregated PPDU or the entire PPDU in the multi-frequency segment transmission mode is transmitted, so that the receiving end determines, based on the channel bandwidth and a frequency segment on which the receiving end parks, rotation coefficients of an EHT-STF and an EHT-LTF that correspond to the frequency segment on which the receiving end parks. In the case that a rotation coefficient of the entire bandwidth is considered, PAPRs of STF and LTF fields within the entire bandwidth may be reduced, and correctness of parsing a data field at a receiving end may be further improved. This is achieved because a correct rotation coefficient is used to demodulate the data field.

In an optional embodiment, rotation coefficients of various bandwidth sizes in the 802.11ax standard are different from rotation coefficients of various bandwidth sizes in the 802.11be standard. Therefore, to ensure that a device of the 802.11ax standard can normally operate in the 802.11be standard (for example, normally receive and send a PPDU), a frequency segment on which the device of the 802.11ax standard parks needs to be constrained. In other words, rotation coefficients of an EHT-STF and an EHT-LTF that correspond to the frequency segment on which the device of the 802.11ax standard parks need to be constrained.

Specifically, when the second communication device is a device of the 802.11ax standard or the second communication device operates in the 802.11ax protocol, the first communication device generates an HE PPDU. The HE PPDU is a sub-PPDU in an aggregated PPDU or a PPDU on a frequency segment in a PPDU in a multi-frequency segment transmission mode. The first communication device sends the HE PPDU. The second communication device receives the HE PPDU on a frequency segment on which the second communication device parks, and parses the HE PPDU. Both rotation coefficients of an EHT-STF and an EHT-LTF that correspond to the frequency segment on which the second communication device parks are 1. The first communication device is an EHT standard device.

It can be learned that in this embodiment of this disclosure, a device of the 802.11ax standard is limited to parking only on a frequency segment corresponding to a rotation coefficient of 1, so that receiving of an old-standard device may not be affected, thereby supporting a new feature of physical layer PPDU aggregation in 802.11be.

Embodiment 4

In Embodiment 4 of this disclosure, a rotation coefficient of each frequency segment in a maximum bandwidth (for example, a maximum bandwidth 320 MHz supported by 802.11be) supported by a standard protocol is specified in the standard protocol, and a transmitting end is constrained to always set the rotation coefficient of each frequency segment based on the maximum bandwidth (for example, 320 MHz), so that a receiving end determines, based on a location, in the maximum bandwidth, of a frequency segment on which the receiving end parks, rotation coefficients of an EHT-STF and an EHT-LTF that correspond to the frequency segment on which the receiving end parks. In this way, PAPRs of STF and the LTF fields can be reduced, and the rotation coefficients of the STF and the LTF that correspond to the frequency segment on which the receiving end parks can be further correctly determined, thereby improving parsing correctness at the receiving end.

FIG. 12 is yet another schematic flowchart of a PPDU transmission method according to an embodiment of this disclosure. As shown in FIG. 12, the PPDU transmission method includes but is not limited to the following steps.

S301: A second communication device determines, based on a frequency segment on which the second communication device parks and a correspondence between each frequency segment in a 320 MHz bandwidth and a rotation coefficient, a rotation coefficient of at least one field in an EHT-STF and an EHT-LTF that correspond to the frequency segment on which the second communication device parks.

The second communication device may be a station device. The station device parks on one of the frequency segments of the 320 MHz bandwidth (or channel). The frequency segment shown in FIG. 4 is used as an example below, that is, the 320 MHz bandwidth (or channel) is divided into four 80 MHz frequency segments.

Specifically, in a process in which the second communication device associates with an AP, the second communication device notifies, via signaling, the second communication device of a frequency segment that is in the 320 MHz channel and on which the second communication device subsequently parks. After receiving the signaling, the second communication device parks on a frequency segment indicated in the AP to receive signaling information/scheduling information. For example, if the AP indicates the second communication device to park on the second 80 MHz frequency segment of the 320 MHz channel, the second communication device parks on the frequency segment indicated in the AP, that is, the second 80 MHz frequency segment of the 320 MHz channel, to receive signaling information/scheduling information of the AP.

After associating with the AP, the second communication device learns of the frequency segment that is in the 320 MHz bandwidth and on which the second communication device parks. Therefore, the second communication device may directly determine, based on the frequency segment on which the second communication device parks and the correspondence that is between each frequency segment in the 320 MHz bandwidth and the rotation coefficient and that is specified in the standard protocol, the rotation coefficient of the at least one field of the EHT-STF and the EHT-LTF that correspond to the frequency segment on which the second communication device parks. For example, assuming that rotation coefficients corresponding to the 320 MHz bandwidth are [x1 x2 x3 x4 x5 x6 x7 x8], and the 320 MHz bandwidth is divided into four 80 MHz frequency segments, the rotation coefficients corresponding to the 320 MHz bandwidth may also be correspondingly divided into four segments of rotation coefficients, and each segment of rotation coefficients corresponds to one 80 MHz frequency segment. Assuming that the second communication device parks on the second frequency segment of the 320 MHz bandwidth, rotation coefficients of the EHT-STF and the EHT-LTF that correspond to the frequency segment on which the second communication device parks are the second segment of rotation coefficients in the rotation coefficients corresponding to the 320 MHz bandwidth, that is, [x3 x4]. A value of xi is 1 or −1, and i indicates an $i^{th}$ element.

It may be understood that "one segment of rotation coefficients" mentioned in this embodiment of this disclosure may be understood as a part of the whole. The segment of rotation coefficients does not necessarily include a plurality of elements, or may include only one element, depending on specifications on rotation coefficients corresponding to channel bandwidths of various sizes in the 802.11be protocol. For example, the rotation coefficients corresponding to the 320 MHz bandwidth are [x1 x2 x3 x4]. Assuming that the second communication device parks on the second frequency segment of the 320 MHz bandwidth, rotation coefficients of the EHT-STF and the EHT-LTF that correspond to the frequency segment on which the second communication device parks are the second segment of rotation coefficients in the rotation coefficients corresponding to the 320 MHz bandwidth, that is, [x2].

It can be understood that "a 320 MHz bandwidth" mentioned in step S301 in this embodiment of this disclosure is only for the 802.11be standard protocol. However, the technical solutions provided in this embodiment of this disclosure may be applicable to a future standard protocol (or a next-generation protocol of the 802.11be standard protocol). In other words, "a 320 MHz bandwidth" mentioned in step S301 in this embodiment of this disclosure may be replaced with a maximum bandwidth supported by a future standard protocol. Assuming that a maximum bandwidth supported by a future-generation standard protocol is 640 MHz, "a 320 MHz bandwidth" in step S301 may be replaced with "a 640 MHz bandwidth".

Optionally, if the second communication device is a device of the 802.11ax standard or the second communication device operates in the 802.11ax protocol, it may be specified in the standard protocol that the second communication device parks on a frequency segment corresponding to a rotation coefficient of 1. For example, assuming that rotation coefficients corresponding to the first frequency segment in the 320 MHz bandwidth are all 1, a device of the 802.11ax standard can park only on the first frequency segment in the 320 MHz bandwidth. It can be learned that in this implementation, the device of the 802.11ax standard is limited to parking only on the frequency segment corresponding to the rotation coefficient of 1, so that receiving of an old-standard device may not be affected, and compatibility between the 802.11be standard and the 802.11ax standard is implemented.

It can be learned that in this embodiment of this disclosure, a correspondence between each frequency segment in a maximum bandwidth supported by the standard protocol and a rotation coefficient is restricted in a standard protocol, and an additional indication does not need to be added to a signal field. In this way, the rotation coefficients of the EHT-STF and the EHT-LTF that correspond to the frequency segment on which the receiving end parks can be determined, so that not only signaling overheads can be reduced, but also a rotation coefficient of the maximum bandwidth can be considered, thereby reducing PAPRs of the STF and the LTF fields.

The foregoing content describes in detail the methods provided in this disclosure. To better implement the foregoing solutions in embodiments of this disclosure, embodiments of this disclosure further provide corresponding apparatuses or devices.

In embodiments of this disclosure, division into function modules may be performed on the first communication device and the second communication device based on the foregoing method examples. For example, each function module may be obtained through division corresponding to each function, or two or more functions may be integrated into one processing module. The integrated module may be implemented in a form of hardware, or may be implemented in a form of a software functional module. Notably, in embodiments of this disclosure, division into the modules is an example and is merely logical function division, and may be another division manner in an actual implementation. The following describes in detail communication apparatuses in embodiments of this disclosure with reference to FIG. 13 to FIG. 15. The communication apparatus is an access point or a station. Further, the communication apparatus may be an apparatus in a first communication device, or the communication apparatus is an apparatus in a second communication device.

Figure 13:
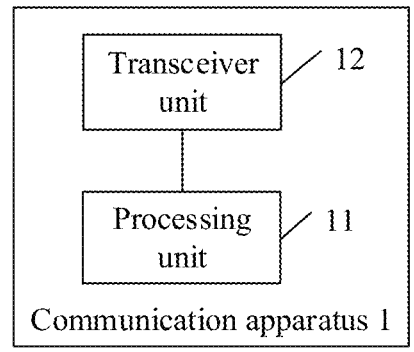
FIG. 13 is a schematic diagram of a structure of a communication apparatus 1 according to an embodiment of this disclosure.

When an integrated unit is used, FIG. 13 is a schematic diagram of a structure of a communication apparatus 1 according to an embodiment of this disclosure. The communication apparatus 1 may be a first communication device or a chip in a first communication device, for example, a Wi-Fi chip. As shown in FIG. 13, the communication apparatus 1 includes a processing unit 11 and a transceiver unit 12.

In a design, the processing unit 11 is configured to generate a first PPDU, where the first PPDU carries rotation coefficient indication information indicating a rotation coefficient of at least one field in an EHT-STF and an EHT-LTF that correspond to a frequency segment on which the first PPDU is transmitted, and the first PPDU is a sub-PPDU in an aggregated PPDU or a PPDU on a frequency segment in a PPDU in a multi-frequency segment transmission mode. The transceiver unit 12 is configured to send the first PPDU.

Optionally, the rotation coefficient indication information is carried in an EHT-SIG or a U-SIG of the first PPDU.

It can be learned that in the communication apparatus 1, an indication of the rotation coefficient is added to the U-SIG or the EHT-SIG, to indicate a rotation coefficient corresponding to one of a plurality of frequency segments on which the aggregated PPDU or the PPDU in the multi-frequency segment transmission mode is transmitted. A rotation coefficient of an entire bandwidth may be considered at a transmitting end, to reduce PAPRs of STF and LTF fields within the entire bandwidth and further improve correctness of parsing a data field at a receiving end.

It can be understood that the communication apparatus 1 in this design may correspondingly perform Embodiment 1, and the foregoing operations or functions of the units in the communication apparatus 1 are used to implement corresponding operations of the first communication device in Embodiment 1. For brevity, details are not described herein.

In another design, the processing unit 11 is configured to generate a first PPDU, where the first PPDU is a sub-PPDU in an aggregated PPDU or a PPDU on a frequency segment in a PPDU in a multi-frequency segment transmission mode, and rotation coefficients of an HE-STF, an HE-LTF, and a data field that correspond to a frequency segment of the first PPDU are the same, or rotation coefficients of an EHT-STF, an EHT-LTF, and a data field that correspond to a frequency segment of the first PPDU are the same. The transceiver unit 12 is configured to send the first PPDU.

The sub-PPDU is an EHT PPDU or an HE PPDU.

Optionally, every 20 MHz, 40 MHz, 80 MHz, or 160 MHz in the HE-STF, the HE-LTF, and the data field that correspond to the frequency segment of the first PPDU corresponds to one rotation coefficient. Alternatively, every 20 MHz, 40 MHz, 80 MHz, or 160 MHz in the EHT-STF, the EHT-LTF, and the data field that correspond to the frequency segment of the first PPDU corresponds to one rotation coefficient.

Optionally, the signal field (herein referred to as a signal field preceding the HE-STF) of the first PPDU and the subsequent HE-STF, HE-LTF, and data field have different rotation coefficients. Alternatively, the signal field (herein referred to as a signal field preceding the EHT-STF) of the first PPDU and the subsequent EHT-STF, EHT-LTF, and data field have different rotation coefficients.

It can be understood that the communication apparatus 1 in this design may correspondingly perform Embodiment 2, and the foregoing operations or functions of the units in the communication apparatus 1 are used to implement corresponding operations of the first communication device in Embodiment 2. For brevity, details are not described herein.

In still another design, the processing unit 11 is configured to generate a first PPDU, where the first PPDU carries a transmit bandwidth of an aggregated PPDU or a PPDU in a multi-frequency segment transmission mode, the transmit bandwidth includes at least two frequency segments, and the first PPDU is a sub-PPDU transmitted on any one of the at least two frequency segments in the aggregated PPDU or a PPDU transmitted on any one of the at least two frequency segments in the PPDU in the multi-frequency segment transmission mode. The transceiver unit 12 is configured to send the first PPDU.

Optionally, the transmit bandwidth is carried in an EHT-SIG or a U-SIG of the first PPDU, the EHT-SIG or the U-SIG further carries a bandwidth of a frequency segment on which the first PPDU is transmitted, and the frequency segment on which the first PPDU is transmitted is the frequency segment on which the second communication device parks.

It can be learned that in the communication apparatus 1, an indication of the transmit bandwidth is added to the U-SIG or the EHT-SIG to indicate the transmit bandwidth on which the aggregated PPDU or the PPDU in the multi-frequency segment transmission mode is transmitted, so that after receiving the transmit bandwidth, the receiving end determines, based on a location, in the transmit bandwidth, of a frequency segment on which the receiving end parks, rotation coefficients of an EHT-STF and an EHT-LTF that correspond to the frequency segment on which the receiving end parks. A rotation coefficient of the entire bandwidth may be considered at the transmitting end, to reduce PAPRs of STF and LTF fields within the entire bandwidth and further improve correctness of parsing a data field at a receiving end.

It can be understood that the communication apparatus 1 in this design may correspondingly perform Embodiment 3, and the foregoing operations or functions of the units in the communication apparatus 1 are used to implement corresponding operations of the first communication device in Embodiment 3. For brevity, details are not described herein.

Figure 14:
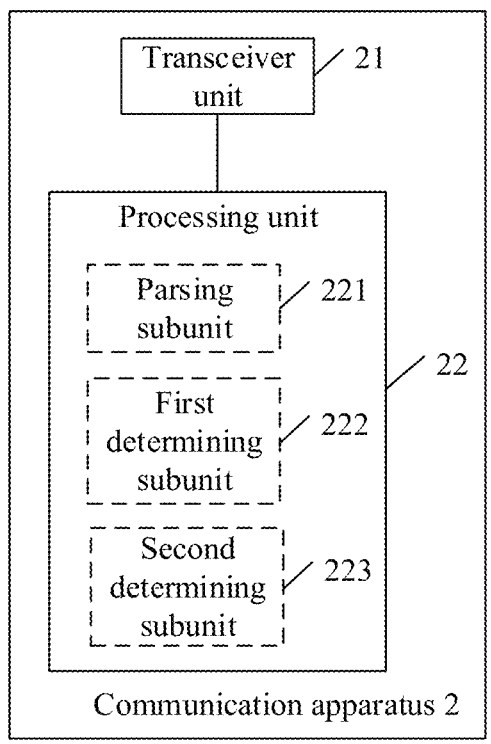
FIG. 14 is a schematic diagram of a structure of a communication apparatus 2 according to an embodiment of this disclosure.

FIG. 14 is a schematic diagram of a structure of a communication apparatus 2 according to an embodiment of this disclosure. The communication apparatus 2 may be a second communication device or a chip in a second communication device, for example, a Wi-Fi chip. As shown in FIG. 14, the communication apparatus 2 includes a transceiver unit 21 and a processing unit 22.

In a design, the transceiver unit 21 is configured to receive a first PPDU, where the first PPDU carries rotation coefficient indication information indicating a rotation coefficient of at least one field in an EHT-STF and an EHT-LTF that correspond to a frequency segment on which the first PPDU is transmitted, and the first PPDU is a sub-PPDU in an aggregated PPDU or a PPDU on a frequency segment in a PPDU in a multi-frequency segment transmission mode. A parsing subunit 221 of the processing unit 22 is configured to parse the first PPDU, to obtain the rotation coefficient that is indicated by the rotation coefficient indication information and that is of the at least one field of the EHT-STF and the EHT-LTF corresponding to the frequency segment on which the first PPDU is transmitted.

Optionally, the frequency segment on which the first PPDU is transmitted is a frequency segment on which the communication apparatus 2 parks.

Optionally, the rotation coefficient indication information is carried in an EHT-SIG or a U-SIG of the first PPDU.

It can be understood that the communication apparatus 2 in this design may correspondingly perform Embodiment 2, and the foregoing operations or functions of the units in the communication apparatus 2 are used to implement corresponding operations of the second communication device in Embodiment 1. For brevity, details are not described herein.

In another design, the transceiver unit 21 is configured to receive a first PPDU, where the first PPDU is a sub-PPDU in an aggregated PPDU or a PPDU on a frequency segment in a PPDU in a multi-frequency segment transmission mode, and rotation coefficients of an HE-STF, an HE-LTF, and a data field that correspond to a frequency segment of the first PPDU are the same, or rotation coefficients of an EHT-STF, an EHT-LTF, and a data field that correspond to a frequency segment of the first PPDU are the same. A parsing subunit 221 of the processing unit 22 is configured to parse the first PPDU. The sub-PPDU may be an EHT PPDU or an HE PPDU.

Optionally, the parsing subunit 221 is specifically configured to: obtain a channel estimation result by using the HE/EHT-LTF, where the channel estimation result includes phase rotation information corresponding to each frequency segment; and demodulate a corresponding data field by using the channel estimation result.

Optionally, a frequency segment on which the communication apparatus parks is the frequency segment on which the first PPDU is transmitted.

Optionally, every 20 MHz, 40 MHz, 80 MHz, or 160 MHz in the HE-STF, the HE-LTF, and the data field that correspond to the frequency segment of the first PPDU corresponds to one rotation coefficient. Alternatively, every 20 MHz, 40 MHz, 80 MHz, or 160 MHz in the EHT-STF, the EHT-LTF, and the data field that correspond to the frequency segment of the first PPDU corresponds to one rotation coefficient.

Optionally, the signal field (herein referred to as a signal field preceding the HE-STF) of the first PPDU and the subsequent HE-STF, HE-LTF, and data field have different rotation coefficients. Alternatively, the signal field (herein referred to as a signal field preceding the EHT-STF) of the first PPDU and the subsequent EHT-STF, EHT-LTF, and data field have different rotation coefficients.

It can be understood that the communication apparatus 2 in this design may correspondingly perform Embodiment 2, and the foregoing operations or functions of the units in the communication apparatus 2 are used to implement corresponding operations of the second communication device in Embodiment 2. For brevity, details are not described herein.

In still another design, the transceiver unit 21 is configured to receive a first PPDU, where the first PPDU carries a transmit bandwidth of an aggregated PPDU or a PPDU in a multi-frequency segment transmission mode, the transmit bandwidth includes at least two frequency segments, and the first PPDU is a sub-PPDU transmitted on any one of the at least two frequency segments in the aggregated PPDU or a PPDU transmitted on any one of the at least two frequency segments in the PPDU in the multi-frequency segment transmission mode. A first determining subunit 222 of the processing unit 22 is configured to determine, based on a frequency segment on which the communication apparatus 2 parks and the transmit bandwidth carried in the first PPDU, a rotation coefficient of at least one field in an EHT-STF and an EHT-LTF that correspond to the frequency segment on which the communication apparatus 2 parks.

Optionally, the transmit bandwidth is carried in an EHT-SIG or a U-SIG of the first PPDU, the EHT-SIG or the U-SIG further carries a bandwidth of a frequency segment on which the first PPDU is transmitted, and the frequency segment on which the first PPDU is transmitted is the frequency segment on which the communication apparatus 2 parks.

It can be understood that the communication apparatus 2 in this design may correspondingly perform Embodiment 3, and the foregoing operations or functions of the units in the communication apparatus 2 are used to implement corresponding operations of the second communication device in Embodiment 3. For brevity, details are not described herein.

In yet another design, the second determining subunit 223 in the processing unit 22 is configured to determine, based on a frequency segment on which the communication apparatus 2 parks and a correspondence between each frequency segment in a 320 MHz bandwidth and a rotation coefficient, a rotation coefficient of at least one field in an EHT-STF and an EHT-LTF that correspond to the frequency segment on which the communication apparatus 2 parks.

Optionally, the correspondence between each frequency segment in the 320 MHz bandwidth and the rotation coefficient is specified in a standard protocol.

It can be learned that in the communication apparatus 2, a correspondence between each frequency segment in a maximum bandwidth supported by the standard protocol and a rotation coefficient is restricted in a standard protocol, and an additional indication does not need to be added to a signal field. In this way, the rotation coefficients of the EHT-STF and the EHT-LTF that correspond to the frequency segment on which the receiving end parks can be determined, so that not only signaling overheads can be reduced, but also a rotation coefficient of the maximum bandwidth can be considered, thereby reducing PAPRs of the STF and the LTF fields.

It can be understood that the communication apparatus 2 in this design may correspondingly perform Embodiment 4, and the foregoing operations or functions of the units in the communication apparatus 2 are used to implement corresponding operations of the second communication device in Embodiment 4. For brevity, details are not described herein.

The foregoing describes the first communication device and the second communication device in this embodiment of this disclosure. The following describes possible product forms of the first communication device and the second communication device. It can be understood that any form of product having a function of the first communication device in FIG. 13 and any form of product having a function of the second communication device in FIG. 14 both fall within the protection scope of embodiments of this disclosure. It can be further understood that the following description is merely an example, and the product forms of the first communication device and the second communication device in this embodiment of this disclosure are not limited thereto.

In a possible product form, the first communication device and the second communication device in embodiments of this disclosure may be implemented by using a general bus architecture.

Figure 15:
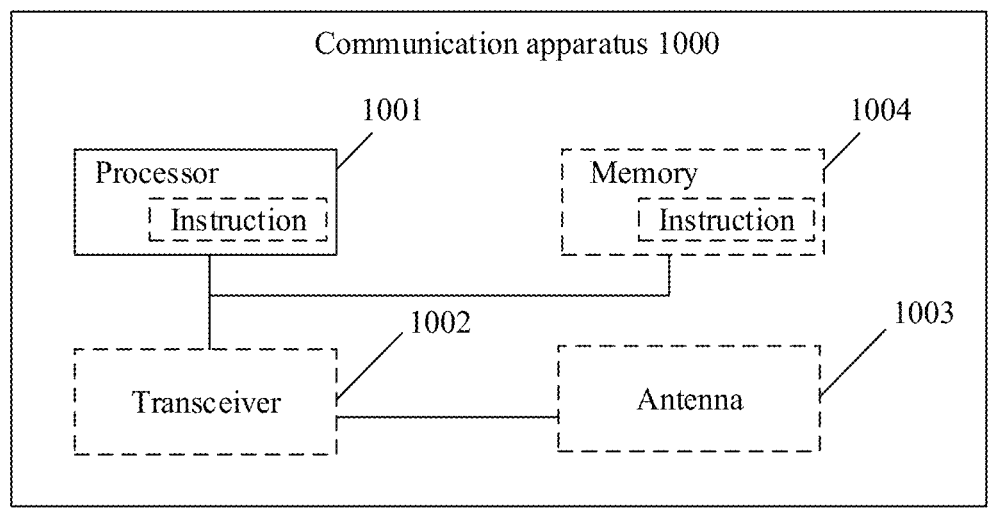
FIG. 15 is a schematic diagram of a structure of a communication apparatus 1000 according to an embodiment of this disclosure.

FIG. 15 is a schematic diagram of a structure of a communication apparatus 1000 according to an embodiment of this disclosure. The communication apparatus 1000 may be a first communication device, a second communication device, or an apparatus in a first communication device or a second communication device. As shown in FIG. 15, the communication apparatus 1000 includes a processor 1001 and a transceiver 1002 that is internally connected to and communicates with the processor. The processor 1001 is a general-purpose processor, a dedicated processor, or the like. For example, the processor 1001 may be a baseband processor or a central processing unit. The baseband processor may be configured to process a communication protocol and communication data, and the central processing unit may be configured to control a communication apparatus (for example, a base station, a baseband chip, a terminal, a terminal chip, a DU, or a CU) to execute a computer program, to process data of the computer program. The transceiver 1002 may be referred to as a transceiver unit, a transceiver, a transceiver circuit, or the like, and is configured to implement a transceiver function. The transceiver 1002 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function. Optionally, the communication apparatus 1000 may further include an antenna 1003 and/or a radio frequency unit (not shown in the figure). The antenna 1003 and/or the radio frequency unit may be located inside the communication apparatus 1000, or may be separated from the communication apparatus 1000. In other words, the antenna 1003 and/or the radio frequency unit may be deployed remotely or in a distributed manner.

Optionally, the communication apparatus 1000 may include one or more memories 1004. The memory 1004 may store instructions. The instructions may be a computer program. The computer program may be run on the communication apparatus 1000, so that the communication apparatus 1000 performs the method described in the foregoing method embodiments. Optionally, the memory 1004 may further store data. The communication apparatus 1000 and the memory 1004 may be separately disposed, or may be integrated.

The processor 1001, the transceiver 1002, and the memory 1004 may be connected through a communication bus.

In a design, the communication apparatus 1000 may be configured to perform a function of the first communication device in Embodiment 1. The processor 1001 may be configured to perform step S101 in FIG. 8 and/or another process of the technology described in this specification. The transceiver 1002 may be configured to perform step S102 in FIG. 8 and/or another process of the technology described in this specification.

In another design, the communication apparatus 1000 may be configured to perform a function of the second communication device in Embodiment 1. The processor 1001 may be configured to perform step S104 in FIG. 8 and/or another process of the technology described in this specification. The transceiver 1002 may be configured to perform step S103 in FIG. 8 and/or another process of the technology described in this specification.

In a design, the communication apparatus 1000 may be configured to perform a function of the first communication device in Embodiment 2. The processor 1001 may be configured to perform step S201 in FIG. 11 and/or another process of the technology described in this specification. The transceiver 1002 may be configured to perform step S202 in FIG. 11 and/or another process of the technology described in this specification.

In another design, the communication apparatus 1000 may be configured to perform a function of the second communication device in Embodiment 2. The processor 1001 may be configured to perform step S204 in FIG. 11 and/or another process of the technology described in this specification. The transceiver 1002 may be configured to perform step S203 in FIG. 11 and/or another process of the technology described in this specification.

In a design, the communication apparatus 1000 may be configured to perform a function of the second communication device in Embodiment 3. The processor 1001 may be configured to perform step S301 in FIG. 12 and/or another process of the technology described in this specification.

In any one of the foregoing designs, the processor 1001 may include a transceiver configured to implement sending and receiving functions. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In any one of the foregoing designs, the processor 1001 may store instructions. The instructions may be a computer program. The computer program is run on the processor 1001, so that the communication apparatus 1000 can perform the method described in the foregoing method embodiments. The computer program may be fixed in the processor 1001, and in this case, the processor 1001 may be implemented by hardware.

In an implementation, the communication apparatus 1000 may include a circuit, and the circuit may implement a sending, receiving, or communication function in the foregoing method embodiments. The processor and the transceiver that are described in this disclosure may be implemented on an integrated circuit (integrated circuit, IC), an analog IC, a radio frequency integrated circuit RFIC, a mixed-signal IC, an application-specific integrated circuit (application-specific integrated circuit, ASIC), a printed circuit board (printed circuit board, PCB), an electronic device, or the like. The processor and the transceiver may alternatively be manufactured by using various IC technologies, for example, a complementary metal oxide semiconductor (complementary metal oxide semiconductor, CMOS), an N-type metal oxide semiconductor (nMetal-oxide-semiconductor, NMOS), a P-type metal oxide semiconductor (positive channel metal oxide semiconductor, PMOS), a bipolar junction transistor (bipolar junction transistor, BJT), a bipolar CMOS (BiCMOS), silicon germanium (SiGe), and gallium arsenide (GaAs).

A scope of the communication apparatus described in this disclosure is not limited thereto, and a structure of the communication apparatus may not be limited by FIG. 15. The communication apparatus may be an independent device or may be a part of a large device. For example, the communication apparatus may be:

(1) an independent integrated circuit IC, a chip, or a chip system or subsystem;

(2) a set including one or more ICs, where optionally, the set of ICs may further include a storage component configured to store data and a computer program;

(3) an ASIC such as a modem (Modem);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, or the like; or (6) others.

In a possible product form, the first communication device and the second communication device in embodiments of this disclosure may be implemented by general-purpose processors.

A general-purpose processor for implementing the first communication device includes a processing circuit and an input/output interface that is internally connected to and communicates with the processing circuit.

In a design, the general-purpose processor may be configured to perform a function of the first communication device in Embodiment 1. Specifically, the processing circuit is configured to perform step S101 in FIG. 8 and/or another process of the technology described in this specification. The input/output interface is configured to perform step S102 in FIG. 8 and/or another process of the technology described in this specification.

In another design, the general-purpose processor may be configured to perform a function of the first communication device in Embodiment 2. Specifically, the processing circuit is configured to perform step S201 in FIG. 11 and/or another process of the technology described in this specification. The input/output interface is configured to perform step S202 in FIG. 11 and/or another process of the technology described in this specification.

A general-purpose processor for implementing the second communication device includes a processing circuit and an input/output interface that is internally connected to and communicates with the processing circuit.

In a design, the general-purpose processor may be configured to perform a function of the second communication device in Embodiment 1. Specifically, the processing circuit is configured to perform step S104 in FIG. 8 and/or another process of the technology described in this specification. The input/output interface is configured to perform step S103 in FIG. 8 and/or another process of the technology described in this specification.

In another design, the general-purpose processor may be configured to perform a function of the second communication device in Embodiment 2. Specifically, the processing circuit is configured to perform step S204 in FIG. 11 and/or another process of the technology described in this specification. The input/output interface is configured to perform step S203 in FIG. 11 and/or another process of the technology described in this specification.

In still another design, the general-purpose processor may be configured to perform a function of the second communication device in Embodiment 3. Specifically, the processing circuit is configured to perform step S301 in FIG. 12 and/or another process of the technology described in this specification.

It can be understood that the communication apparatuses in the foregoing various product forms have any function of the first communication device or the second communication device in the foregoing method embodiments. Details are not described herein.

An embodiment of this disclosure further provides a computer-readable storage medium. The computer-readable storage medium stores computer program code. When the processor executes the computer program code, an electronic device performs the method in any one of the foregoing embodiments.

An embodiment of this disclosure further provides a computer program product. When the computer program product runs on a computer, the computer is enabled to perform the method in any one of the foregoing embodiments.

An embodiment of this disclosure further provides a communication apparatus. The apparatus may exist in a product form of a chip. A structure of the apparatus includes a processor and an interface circuit. The processor is configured to communicate with another apparatus through the interface circuit, to enable the apparatus to perform the method in any one of the foregoing embodiments.

Method or algorithm steps described in combination with the content disclosed in this disclosure may be implemented by hardware, or may be implemented by a processor by executing software instructions. The software instructions may include a corresponding software module. The software module may be stored in a random access memory (Random Access Memory, RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a core network interface device. Certainly, the processor and the storage medium may exist in the core network interface device as discrete components.

A person skilled in the art should be aware that in the foregoing one or more examples, functions described in this disclosure may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer-readable storage medium and a communication medium. The communication medium includes any medium that facilitates transmission of a computer program from one place to another. The storage medium may be any available medium accessible to a general-purpose or a dedicated computer.

In the foregoing specific implementations, the objectives, technical solutions, and advantageous effects of this disclosure are further described in detail. It can be understood that the foregoing descriptions are merely specific implementations of this disclosure, but are not intended to limit the protection scope of this disclosure. Any modification, equivalent replacement, improvement, or the like made based on the technical solutions of this disclosure shall fall within the protection scope of this disclosure.

What is claimed is:

1. A physical layer protocol data unit (PPDU) transmission method, comprising:
generating, by a first communication device, a first physical layer protocol data unit (PPDU), wherein the first PPDU carries rotation coefficient indication information indicating a rotation coefficient of at least one field, the at least one field comprising at least one of an extremely high throughput short training field (EHT-STF) or an extremely high throughput long training field (EHT-LTF) and corresponding to a first frequency segment on which the first PPDU is transmitted, and the first PPDU being a sub-PPDU in an aggregated PPDU or a PPDU on a frequency segment among at least one PPDU in a multi-frequency segment transmission mode; and
sending, by the first communication device, the first PPDU.

2. The method according to claim 1, wherein the first frequency segment is a frequency segment on which a second communication device that receives the first PPDU parks.

3. The method according to claim 2, wherein the first frequency segment is different from a band range used by the second communication device to receive a data field of the first PPDU.

4. The method according to claim 1, wherein the rotation coefficient indication information is carried in an extremely high throughput signal field (EHT-SIG) or a universal signal field (U-SIG) of the first PPDU.

5. The method according to claim 4, wherein the EHT-SIG or the U-SIG has a second rotation coefficient different from the rotation coefficient of the at least one field.

6. The method according to claim 1, wherein the rotation coefficient indication information indicates multiple rotation coefficients each corresponding to one of multiple channels of the first frequency segment.

7. The method according to claim 1, wherein the rotation coefficient indication information indicates a first rotation coefficient of the EHT-STF and a third rotation coefficient of the EHT-LTF.

8. A communication apparatus, comprising:
a processor, configured to generate a first physical layer protocol data unit (PPDU), wherein the first PPDU carries rotation coefficient indication information indicating a rotation coefficient of at least one field, the at least one field comprising at least one of an extremely high throughput short training field (EHT-STF) or an extremely high throughput long training field (EHT-LTF) and corresponding to a first frequency segment on which the first PPDU is transmitted, and the first PPDU being a sub-PPDU in an aggregated PPDU or a PPDU on a frequency segment among at least one PPDU in a multi-frequency segment transmission mode; and
a transceiver, configured to send the first PPDU.

9. The communication apparatus according to claim 8, wherein the first frequency segment is a frequency segment on which a second communication device that receives the first PPDU parks.

10. The communication apparatus according to claim 9, wherein the first frequency segment is different from a band range used by the second communication device to receive a data field of the first PPDU.

11. The communication apparatus according to claim 8, wherein the rotation coefficient indication information is carried in an extremely high throughput signal field (EHT-SIG) or a universal signal field (U-SIG) of the first PPDU.

12. The communication apparatus according to claim 11, wherein the EHT-SIG or the U-SIG has a second rotation coefficient different from the rotation coefficient of the at least one field.

13. The communication apparatus according to claim 8, wherein the rotation coefficient indication information indicates multiple rotation coefficients each corresponding to one of multiple channels of the first frequency segment.

14. The communication apparatus according to claim 8, wherein the rotation coefficient indication information indicates a first rotation coefficient of the EHT-STF and a third rotation coefficient of the EHT-LTF.

15. A communication apparatus, comprising:
a transceiver, configured to receive a first physical layer protocol data unit (PPDU), wherein the first PPDU carries rotation coefficient indication information indicating a rotation coefficient of at least one field, the at least one field comprising at least one of an extremely high throughput short training field (EHT-STF) or an extremely high throughput long training field (EHT-LTF) and corresponding to a first frequency segment on which the first PPDU is transmitted, and the first PPDU being a sub-PPDU in an aggregated PPDU or a PPDU on a frequency segment among at least one PPDU in a multi-frequency segment transmission mode; and
a processor, configured to parse the first PPDU, to obtain the rotation coefficient in accordance with the rotation coefficient indication information of the at least one field.

16. The communication apparatus according to claim 15, wherein the first frequency segment is a frequency segment on which a second communication device that receives the first PPDU parks.

17. The communication apparatus according to claim 16, wherein the first frequency segment is different from a band range used by the communication apparatus to receive a data field of the first PPDU.

18. The communication apparatus according to claim 15, wherein the rotation coefficient indication information is carried in an extremely high throughput signal field (EHT-SIG) or a universal signal field (U-SIG) of the first PPDU.

19. The communication apparatus according to claim 15, wherein the rotation coefficient indication information indicates:
multiple rotation coefficients each corresponding to one of multiple channels of the first frequency segment; or
a first rotation coefficient of the EHT-STF and a second rotation coefficient of the EHT-LTF.

20. The communication apparatus according to claim 15, wherein the processor is further configured to obtain, based on the at least one field, a channel estimation result comprising phase rotation information corresponding to each frequency segment, and demodulate a data field of the first PPDU in accordance with the channel estimation result.

* * * * *